(12) United States Patent
Friedman et al.

(10) Patent No.: US 11,140,171 B1
(45) Date of Patent: Oct. 5, 2021

(54) ESTABLISHING AND VERIFYING IDENTITY USING ACTION SEQUENCES WHILE PROTECTING USER PRIVACY

(71) Applicant: Apple Inc., Cupertino, CA (US)

(72) Inventors: Eric D. Friedman, Berkeley, CA (US);
Nathaniel C. Bush, San Jose, CA (US);
Jefferson Provost, Austin, TX (US);
Vignesh Kumar, Austin, TX (US);
Gregory J. Kuhlmann, Austin, TX (US); Tal Tversky, Austin, TX (US);
Ritwik K. Kumar, San Jose, CA (US);
Eric M. Gottschalk, Seattle, WA (US);
Lucas O. Winstrom, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 16/503,188

(22) Filed: Jul. 3, 2019

Related U.S. Application Data

(63) Continuation-in-part of application No. 16/191,346, filed on Nov. 14, 2018, now abandoned, which is a
(Continued)

(51) Int. Cl.
*H04L 29/06* (2006.01)
*G06F 21/62* (2013.01)

(52) U.S. Cl.
CPC ........ *H04L 63/102* (2013.01); *G06F 21/6218* (2013.01); *H04L 63/062* (2013.01); *H04L 63/0861* (2013.01)

(58) Field of Classification Search
CPC ... H04L 63/06; H04L 63/0861; H04L 63/083; G06F 2221/2131
See application file for complete search history.

(56) References Cited

U.S. PATENT DOCUMENTS

| 4,993,068 A | 2/1991 | Piosenka et al. |
| 5,053,608 A | 10/1991 | Senanayake |

(Continued)

FOREIGN PATENT DOCUMENTS

| JP | 2000163031 | 6/2000 |
| JP | 2002073566 | 3/2002 |

(Continued)

OTHER PUBLICATIONS

U.S. Appl. No. 15/171,951, "Non-Final Office Action", dated Feb. 9, 2018, 18 pages.
(Continued)

*Primary Examiner* — Ellen Tran
(74) *Attorney, Agent, or Firm* — Kilpatrick Townsend & Stockton LLP

(57) ABSTRACT

A user device can verify a user's identity to a server while protecting user privacy by not sharing personal data with any other device. To ensure user privacy, the user device performs an enrollment process in which the user performs an action sequence. The user device collects action data from the action sequence and uses the action data locally to generate a set of public/private key pairs (or other representation) from which information about the action sequence cannot be extracted. The public keys, but not the underlying action data, are sent to a server to store. To verify user identity, a user device can repeat the collection of action data and the generation of the key pairs. If the device can prove to the server its possession of the private keys to a sufficient degree, the user's identity can be verified.

34 Claims, 8 Drawing Sheets

Related U.S. Application Data continuation-in-part of application No. 15/171,951, filed on Jun. 2, 2016, now abandoned, which is a continuation of application No. 14/870,835, filed on Sep. 30, 2015, now abandoned.

(60) Provisional application No. 62/171,998, filed on Jun. 5, 2015.

(56) References Cited

U.S. PATENT DOCUMENTS

| | | |
|---|---|---|
| 5,131,038 A | 7/1992 | Puhl et al. |
| 5,214,702 A | 5/1993 | Fischer |
| 5,280,527 A | 1/1994 | Gullman et al. |
| 5,469,506 A | 11/1995 | Berson et al. |
| 5,473,692 A | 12/1995 | Davis |
| 5,481,265 A | 1/1996 | Russell |
| 5,483,261 A | 1/1996 | Yasutake |
| 5,488,204 A | 1/1996 | Mead et al. |
| 5,526,428 A | 6/1996 | Arnold |
| 5,591,949 A | 1/1997 | Bernstein |
| 5,613,012 A | 3/1997 | Hoffman et al. |
| 5,615,277 A | 3/1997 | Hoffman |
| 5,659,616 A | 8/1997 | Sudia |
| 5,729,220 A | 3/1998 | Russell |
| 5,784,463 A | 7/1998 | Chen et al. |
| 5,805,719 A | 9/1998 | Pare, Jr. et al. |
| 5,825,352 A | 10/1998 | Bisset et al. |
| 5,835,079 A | 11/1998 | Shieh |
| 5,838,812 A | 11/1998 | Pare, Jr. et al. |
| 5,870,723 A | 2/1999 | Pare, Jr. et al. |
| 5,872,848 A | 2/1999 | Romney et al. |
| 5,880,411 A | 3/1999 | Gillespie et al. |
| 5,920,640 A | 7/1999 | Salatino et al. |
| 5,930,804 A | 7/1999 | Yu et al. |
| 5,952,641 A | 9/1999 | Korshun |
| 5,991,408 A | 11/1999 | Pearson et al. |
| 6,038,666 A | 3/2000 | Hsu et al. |
| 6,041,410 A | 3/2000 | Hsu et al. |
| 6,076,167 A | 6/2000 | Borza |
| 6,084,968 A | 7/2000 | Kennedy et al. |
| 6,154,879 A | 11/2000 | Pare, Jr. et al. |
| 6,167,517 A | 12/2000 | Gilchrist et al. |
| 6,181,803 B1 | 1/2001 | Davis |
| 6,182,221 B1 | 1/2001 | Hsu et al. |
| 6,185,316 B1 | 2/2001 | Buffam |
| 6,188,391 B1 | 2/2001 | Seely et al. |
| 6,201,484 B1 | 3/2001 | Russell |
| 6,202,151 B1 | 3/2001 | Musgrave et al. |
| 6,219,793 B1 | 4/2001 | Li et al. |
| 6,256,737 B1 | 7/2001 | Bianco et al. |
| 6,268,788 B1 | 7/2001 | Gray |
| 6,282,649 B1 | 8/2001 | Lambert et al. |
| 6,310,610 B1 | 10/2001 | Beaton et al. |
| 6,310,966 B1 | 10/2001 | Dulude et al. |
| 6,317,834 B1 | 11/2001 | Gennaro et al. |
| 6,323,846 B1 | 11/2001 | Westerman et al. |
| 6,353,889 B1 | 3/2002 | Hollingshead |
| 6,356,753 B1 | 3/2002 | Kolev et al. |
| 6,366,682 B1 | 4/2002 | Hoffman et al. |
| 6,367,013 B1 | 4/2002 | Bisbee et al. |
| 6,367,017 B1 | 4/2002 | Gray |
| 6,397,198 B1 | 5/2002 | Hoffman et al. |
| 6,446,210 B1 | 9/2002 | Borza |
| 6,466,781 B1 | 10/2002 | Bromba et al. |
| 6,484,260 B1 | 11/2002 | Scott et al. |
| 6,487,662 B1 | 11/2002 | Kharon et al. |
| 6,490,680 B1 | 12/2002 | Scheidt et al. |
| 6,505,193 B1 | 1/2003 | Musgrave et al. |
| 6,529,885 B1 | 3/2003 | Johnson |
| 6,532,298 B1 | 3/2003 | Cambier et al. |
| 6,550,012 B1 | 4/2003 | Villa et al. |
| 6,581,161 B1 | 6/2003 | Byford |
| 6,587,945 B1 | 7/2003 | Pasieka |
| 6,601,172 B1 | 7/2003 | Epstein |
| 6,609,198 B1 | 8/2003 | Wood et al. |
| 6,615,264 B1 | 9/2003 | Stoltz et al. |
| 6,618,806 B1 | 9/2003 | Brown et al. |
| 6,636,973 B1 | 10/2003 | Novoa et al. |
| 6,657,538 B1 | 12/2003 | Ritter |
| 6,662,166 B2 | 12/2003 | Pare, Jr. et al. |
| 6,668,332 B1 | 12/2003 | McNeil |
| 6,671,808 B1 | 12/2003 | Abbott et al. |
| 6,681,034 B1 | 1/2004 | Russo |
| 6,690,387 B2 | 2/2004 | Zimmerman et al. |
| 6,719,200 B1 | 4/2004 | Wiebe |
| 6,728,881 B1 | 4/2004 | Karamchetty |
| 6,735,695 B1 | 5/2004 | Gopalakrishnan et al. |
| 6,751,734 B1 | 6/2004 | Uchida |
| 6,757,411 B2 | 6/2004 | Chau |
| 6,765,470 B2 | 7/2004 | Shinzaki |
| 6,766,040 B1 | 7/2004 | Catalano et al. |
| 6,775,776 B1 | 8/2004 | Vogt et al. |
| 6,786,397 B2 | 9/2004 | Silverbrook et al. |
| 6,816,970 B2 | 11/2004 | Morgan et al. |
| 6,819,219 B1 | 11/2004 | Bolle et al. |
| 6,820,202 B1 | 11/2004 | Wheeler et al. |
| 6,829,711 B1 | 12/2004 | Kwok et al. |
| 6,832,317 B1 | 12/2004 | Strongin et al. |
| 6,834,351 B1 | 12/2004 | Kabenjian |
| 6,836,765 B1 | 12/2004 | Sussman |
| 6,836,843 B2 | 12/2004 | Seroussi et al. |
| 6,839,688 B2 | 1/2005 | Drummond et al. |
| 6,844,660 B2 | 1/2005 | Scott |
| 6,848,052 B2 | 1/2005 | Hamid |
| 6,850,147 B2 | 2/2005 | Prokoski et al. |
| 6,850,252 B1 | 2/2005 | Hoffberg |
| 6,853,739 B2 | 2/2005 | Kyle |
| 6,853,988 B1 | 2/2005 | Dickinson et al. |
| 6,857,073 B2 | 2/2005 | French et al. |
| 6,862,443 B2 | 3/2005 | Witte |
| 6,870,946 B1 | 3/2005 | Teng et al. |
| 6,870,966 B1 | 3/2005 | Silverbrook et al. |
| 6,871,193 B1 | 3/2005 | Campbell et al. |
| 6,871,287 B1 | 3/2005 | Ellingson |
| 6,871,784 B2 | 3/2005 | Jayaratne et al. |
| 6,876,757 B2 | 4/2005 | Yau et al. |
| 6,877,097 B2 | 4/2005 | Hamid et al. |
| 6,879,243 B1 | 4/2005 | Booth et al. |
| 6,879,966 B1 | 4/2005 | Lapsley et al. |
| 6,880,749 B1 | 4/2005 | Green et al. |
| 6,880,750 B2 | 4/2005 | Pentel |
| 6,883,709 B2 | 4/2005 | Joseph et al. |
| 6,886,096 B2 | 4/2005 | Appenzeller et al. |
| 6,886,101 B2 | 4/2005 | Glazer et al. |
| 6,886,104 B1 | 4/2005 | McClurg et al. |
| 6,888,445 B2 | 5/2005 | Gotfried et al. |
| 6,898,577 B1 | 5/2005 | Johnson |
| 6,901,154 B2 | 5/2005 | Dunn |
| 6,901,155 B2 | 5/2005 | Xia et al. |
| 6,901,266 B2 | 5/2005 | Henderson |
| 6,901,382 B1 | 5/2005 | Richards et al. |
| 6,914,517 B2 | 7/2005 | Kinsella et al. |
| 6,957,185 B1 | 10/2005 | Labaton |
| 6,957,337 B1 | 10/2005 | Chainer et al. |
| 6,959,382 B1 | 10/2005 | Kinnis et al. |
| 6,963,659 B2 | 11/2005 | Tumey et al. |
| 6,985,502 B2 | 1/2006 | Bunton |
| 6,990,444 B2 | 1/2006 | Hind et al. |
| 7,015,894 B2 | 3/2006 | Morohoshi et al. |
| 7,024,562 B1 | 4/2006 | Flink et al. |
| 7,028,191 B2 | 4/2006 | Michener et al. |
| 7,035,442 B2 | 4/2006 | Ha et al. |
| 7,069,444 B2 | 6/2006 | Lowensohn et al. |
| 7,111,173 B1 | 9/2006 | Scheidt |
| 7,184,064 B2 | 2/2007 | Zimmerman et al. |
| 7,287,158 B2 | 10/2007 | Futamura et al. |
| 7,305,562 B1 | 12/2007 | Bianco et al. |
| 7,310,734 B2 | 12/2007 | Boate et al. |
| 7,590,861 B2 | 9/2009 | Abdallah et al. |
| 7,613,659 B1 | 11/2009 | Hoffman et al. |
| 7,663,607 B2 | 2/2010 | Hotelling et al. |
| 7,689,832 B2 | 3/2010 | Talmor et al. |
| 7,788,501 B2 | 8/2010 | Abdallah et al. |

(56) References Cited

U.S. PATENT DOCUMENTS

| | | |
|---|---|---|
| 8,001,372 B2 | 8/2011 | Abdallah et al. |
| 8,055,906 B2 | 11/2011 | Abdallah et al. |
| 8,127,143 B2 | 2/2012 | Abdallah et al. |
| 8,407,480 B2 | 3/2013 | Abdallah et al. |
| 8,478,992 B2 | 7/2013 | Abdallah et al. |
| 8,479,122 B2 | 7/2013 | Hotelling et al. |
| 8,522,011 B2 | 8/2013 | Spalka et al. |
| 8,550,339 B1 | 10/2013 | Newman et al. |
| 8,638,939 B1 | 1/2014 | Casey et al. |
| 8,826,031 B2 | 9/2014 | Abdallah et al. |
| 9,160,537 B2 | 10/2015 | Abdallah et al. |
| 9,270,464 B2 | 2/2016 | Abdallah et al. |
| 9,716,698 B2 | 7/2017 | Abdallah et al. |
| 2001/0001876 A1 | 5/2001 | Morgan et al. |
| 2001/0034836 A1 | 10/2001 | Matsumoto et al. |
| 2002/0003892 A1 | 1/2002 | Iwanaga |
| 2002/0018585 A1 | 2/2002 | Kim |
| 2002/0023217 A1 | 2/2002 | Wheeler et al. |
| 2002/0025044 A1 | 2/2002 | Saito |
| 2002/0026427 A1 | 2/2002 | Kon et al. |
| 2002/0031230 A1 | 3/2002 | Sweet et al. |
| 2002/0034319 A1 | 3/2002 | Tumey et al. |
| 2002/0056043 A1 | 5/2002 | Glass |
| 2002/0087857 A1 | 7/2002 | Tsao et al. |
| 2002/0095586 A1 | 7/2002 | Doyle et al. |
| 2002/0104006 A1 | 8/2002 | Boate et al. |
| 2002/0104025 A1 | 8/2002 | Wrench, Jr. |
| 2002/0129236 A1 | 9/2002 | Nuutinen |
| 2002/0129251 A1 | 9/2002 | Itakura et al. |
| 2002/0133716 A1 | 9/2002 | Harif |
| 2002/0150241 A1 | 10/2002 | Scheidt et al. |
| 2002/0174344 A1 | 11/2002 | Ting |
| 2002/0176583 A1 | 11/2002 | Buttiker |
| 2002/0186838 A1 | 12/2002 | Brandys |
| 2003/0005310 A1 | 1/2003 | Shinzaki |
| 2003/0089764 A1 | 5/2003 | Meadow et al. |
| 2003/0097586 A1 | 5/2003 | Mok |
| 2003/0101349 A1 | 5/2003 | Wang |
| 2003/0115475 A1 | 6/2003 | Russo et al. |
| 2003/0115490 A1 | 6/2003 | Russo et al. |
| 2003/0140233 A1 | 7/2003 | Samar |
| 2003/0200257 A1 | 10/2003 | Milgramm et al. |
| 2003/0226015 A1 | 12/2003 | Neufeld et al. |
| 2003/0233556 A1 | 12/2003 | Angelo et al. |
| 2004/0015958 A1 | 1/2004 | Veil et al. |
| 2004/0044627 A1 | 3/2004 | Russell et al. |
| 2006/0197753 A1 | 9/2006 | Hotelling |
| 2007/0124597 A1 | 5/2007 | Bedingfield, Sr. |
| 2008/0230598 A1 | 9/2008 | Bodin |
| 2009/0030778 A1 | 1/2009 | Zapata et al. |
| 2009/0031140 A1 | 1/2009 | Abdallah et al. |
| 2009/0037745 A1 | 2/2009 | Abdallah et al. |
| 2009/0037746 A1 | 2/2009 | Abdallah et al. |
| 2009/0320123 A1 | 12/2009 | Yu et al. |
| 2010/0005315 A1 | 1/2010 | Abdallah et al. |
| 2011/0313779 A1 | 12/2011 | Herzog et al. |
| 2012/0047370 A1 | 2/2012 | Abdallah et al. |
| 2012/0124662 A1 | 5/2012 | Baca et al. |
| 2013/0160088 A1 | 6/2013 | McFarland |
| 2014/0237256 A1 | 8/2014 | Ben Ayed |
| 2014/0289833 A1 | 9/2014 | Briceno et al. |
| 2014/0333524 A1* | 11/2014 | Liu .................. H04L 63/08 345/156 |
| 2016/0065373 A1 | 3/2016 | Abdallah et al. |

FOREIGN PATENT DOCUMENTS

| | | |
|---|---|---|
| JP | 2002342033 | 11/2002 |
| WO | 9908238 | 2/1999 |
| WO | 0065770 | 11/2000 |
| WO | 0141032 | 6/2001 |
| WO | 0192994 | 12/2001 |
| WO | 2004014017 | 2/2004 |

OTHER PUBLICATIONS

U.S. Appl. No. 15/171,951 , "Notice of Allowance", dated Aug. 15, 2018, 17 pages.

Davida et al., "On Enabling Secure Applications through Offwline Biometric Identification", Security and Privacy, Proceedings of the 1998 IEEE Symposium, May 1998, pp. 148-157.

Guse et al., "Gesture-based User Authentication for Mobile Devices using Accelerometer and Gyroscope", Conference Paper, Available online at: http://www.researchgate.net/publication/235988370, Mar. 2012, 4 pages.

Isobe et al., "Development of Personal Authentication System using Fingerprint with Digital Signature Technologie", Proceedings of the 34th Hawaii International Conference on System Sciences, Jan. 2001, pp. 1-9.

Komatsu , "PKI Handbook", Soft Research Center Inc., Nov. 25, 2000, pp. 105-108.

Lee et al., "A Muiti-Touch Three Dimensional Touch-Sensitive Tablet", Proceedings of CHI: ACM Conference on Human Factors in Computing Systems, Apr. 1985, pp. 21-25.

Rubine , "Combining Gestures and Direct Manipulation", CHI '92, May 3-7, 1992, pp. 659-660.

Rubine , "The Automatic Recognition of Gestures", CMU-CS-91-202, Submitted in Partial Fulfillment of the Requirements for the Degree of Doctor of Philosophy in Computer Science at CarneQie Mellon University, Dec. 1991, 285 pages.

Schneier , "Applied Cryptography: Protocols, Algorithms, and Source Code in C", Second Edition, John Wiley & Sons, Inc.,, 1996, pp. 31-34.

Vadhan , "A Study of Statistical Zero-Knowledge Proofs", Massachusetts Institute of Technology, Sep. 1999, 190 pages.

Westerman , "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

ESTABLISHING AND VERIFYING IDENTITY USING ACTION SEQUENCES WHILE PROTECTING USER PRIVACY

CROSS-REFERENCES TO RELATED APPLICATIONS

This application is a continuation in part of U.S. patent application Ser. No. 16/191,346, filed Nov. 14, 2018, which is a continuation in part of U.S. patent application Ser. No. 15/171,951, filed on Jun. 2, 2016, which is a continuation of U.S. patent application Ser. No. 14/870,835, filed Sep. 30, 2015, entitled "Establishing and Verifying Identity Using Action Sequences", which claims the benefit of U.S. Provisional Application No. 62/171,998, filed Jun. 5, 2015, entitled "Establishing and Verifying Identity Using Action Sequences." The disclosures of these applications are incorporated by reference herein in their entirety.

The present disclosure is related to commonly-assigned U.S. Provisional Application No. 62/172,006, filed Jun. 5, 2015, the disclosure of which is incorporated herein by reference.

BACKGROUND

The present disclosure relates generally to data security and in particular to establishing and verifying the identity of a person using action sequences while protecting user privacy.

Individuals are conducting more and more activity online, from banking to commerce to data storage and retrieval. In a situation where an individual is likely to conduct multiple transactions with a particular service provider, the individual is typically invited to establish a user account with the service provider. The user account can store personal information about the individual user (e.g., name, email address, surface mail address, phone number, billing information such as a credit card number, and so on). In some instances, having an account may be required to use the services of the service provider.

For a number of reasons, it is desirable to protect user accounts from being accessed by anyone other than the authorized user. Accordingly, account creation typically includes establishing a user identity (e.g., a so-called "username") and a security credential (e.g., a password) for the account. The security credential is intended to be kept secret from everyone except the authorized user (and in some instances the service provider, depending on the security protocols used). In a "normal" login procedure defined by the service provider, the user can access the account by presenting the username and security credential (or satisfactory proof of having the security credential, depending on the security protocols) to the service provider.

Such protection is known to be less than perfect. For example, a user may forget the password or lose a device on which the password is stored, which can prevent the user from accessing the account using the normal login procedure. Or in some cases, the secrecy of a security credential may be compromised (e.g., a password can be stolen), which may allow unauthorized parties to access the user account. This can result in the service provider blocking normal login access to the user account.

Many service providers, therefore, find it useful to allow the user to enroll the user account in an account recovery service. The account recovery service can define alternative protocols for verifying the user's identity in case the normal login procedure becomes unusable. If these alternative protocols are completed successfully, the user can be allowed to access the account despite not having or not being allowed to use the established security credential. One commonly used account-recovery protocol is based on "challenge-response" questions. At enrollment time, the user can be prompted to provide answers to a set of questions, the answers to which are assumed to be easy for the user to recall but difficult for would-be impostors to determine. Typical questions include "What was the model of your first car?" or "What was your first pet's name?" The service provider stores the answers given at enrollment time, and the user can verify her identity at a later time by providing a matching set of answers. However, to the extent that the answers to typical challenge-response questions can be found out by someone other than the user who answered them, this protocol may allow unauthorized persons to access a user account.

Another identity-verification protocol involves using alternative contact information included in the user account record to verify that a request for access originates with the authorized user. For example, if the user indicates to the service provider that her password has been lost, the service provider can send a message to an email address or phone number included in the user account record. The message can contain a secret confirmation code that the user can provide back to the service provider to prove that she is the authorized user—or at least that she has access to the authorized user's phone or email account. Such methods can be problematic if the user has also lost access to a phone or email account (or if someone else has gained access).

SUMMARY

Certain embodiments of the present invention relate to techniques for establishing and verifying a user's identity using action data generated from a sequence of actions performed by the user and a security protocol that avoids any sharing of secrets such as the action data or the underlying sequence of actions. In some embodiments, the secrets do not leave the user device that generates them. For example, a user enrolling in an account recovery service or an identity verification service can operate her personal device to collect "action data" while the user performs a sequence of actions. Depending on implementation, the sequence of actions can include traversing a specific route from one place to another, moving the user device in a particular pattern selected by the user, invoking a device function (e.g., playing a song selected by the user, calling or texting a specific person selected by the user, launching an app selected by the user, taking a specific action within an app, taking a photo), presenting a biometric identifier (e.g., fingerprint, the user's face, a voice sample of the user saying something) to a sensor of the user device, and so on. Any sequence of actions that the user can repeat at a later time can be used. Using various onboard sensors, the user's device can capture "action data" of various kinds as the user performs the sequence. For example, if the user traverses a route, action data can be generated using GPS sensors and/or an accelerometer. Where the user is walking (or otherwise moving with a particular gait), action data representing the user's gait (e.g., stride length, cadence, ground force, etc.) can also be captured. If the user moves the device around, action data representing the movement can be generated using an accelerometer. For a text or call, action data can include a phone number of the recipient or the like. If an app is launched, action data can include a coded value indicating which app was launched. If a photo is taken, action data can include the fact of taking a photo and/or data based on the content of the photo (e.g., results of an image analysis algorithm). Other examples are described below. Action data collected across the entire duration of the action sequence can be defined such that it constitutes a secret that only the user can reliably reproduce.

In some embodiments, the user's device can execute an algorithm to convert the action data to an input data set for a cryptographic key-pair generation algorithm. The key-pair generation algorithm, which can also execute on the user's device can generate a set of N public/private key pairs (where N is an arbitrary number and can be large, e.g., on the order of 100, 500, or more) in a manner such that no information about the user action can be extracted from the public/private key pairs. The user device can send the N public keys to a server operated by the service provider for storage and can destroy the private keys. The server can store the N public keys as account recovery keys. Later, when the user wants to verify her identity, e.g., to recover access to the account or for other purposes, a "recovery device" or "verification device" (which can be the same user device or a different device) device can repeat the operations of collecting the action data, converting the action data to an input data set, and generating another set of N public/private key pairs. The same algorithms can be used, so that if the action data is identical between the two sets of measurements, the second set of public/private key pairs will exactly match the first.

In general, it is expected that action data collected from the same person will not be identical from one performance of the action sequence to the next (especially if two different devices are used to collect the action data). Accordingly, in some embodiments, recovery or identity verification can proceed without requiring all N keys to match the first set. Instead, the recovery device (or verification device) can be required to prove to the server that at least a minimum fraction (K/N, for some number K<N) of the second set of key pairs matches the first set of public keys. The minimum fraction can be chosen by the server and can be based on a risk profile associated with the user account, so that different users may be subject to different minimum fractions. Other thresholds for proof can also be applied. For instance, different key pairs can be assigned different weights and the threshold of proof can be based on the sum of weights of the matched keys.

The use of key pairs for verification is not required. For example, the action data collected from an action sequence can be regarded as a secret generated by the user. The goal of verification is to determine whether a person purporting to be the user can reproduce the same secret (at least to a close approximation). In instances where the verification is to be performed by a server (or more generally any device other than the device on which the secret is initially generated), it may be useful to construct a "public representation" of the action data and provide only the public representation to the server. The public representation can include a set of information items derived from the set of action data (but from which the action data or the underlying action sequence cannot be inferred) that can be used by the server to determine whether the action data has been reproduced, without the server becoming privy to the action data or the underlying action sequence. A set of N key pairs can serve as a public representation, but other representations are possible. In instances where the verification is to be performed on the device that collected the action data, the device can store the action data (e.g., in a secure storage element), and a public representation would not be needed.

In some embodiments, the ability to verify a user's identity based on an action sequence can be used to allow the user to recover access to an account, e.g., when the user has forgotten a password. In addition or instead, the ability to verify a user's identity based on an action sequence can be used in any situation where verification of a user's identity is desirable. In some embodiments, an identity server system can provide an identity verification service to one or more other server systems, including server systems operated by third parties. In all cases, it is possible to verify the user identity while preserving user privacy: the user's device can collect data about an action sequence and generate a public representation of that data using an algorithm such that no information about the action sequence is recoverable from the public representation. The user's device can provide portions (or all) of the public representation to an identity server without revealing personal information about the user.

The following detailed description together with the accompanying drawings will provide a better understanding of the nature and advantages of the present invention.

DETAILED DESCRIPTION

Certain embodiments of the present invention relate to techniques for establishing and verifying a user's identity using action data generated from a sequence of actions performed by the user and a security protocol that avoids any sharing of secrets such as the action data or the underlying sequence of actions. In some embodiments, the secrets do not leave the user device that generates them. For example, a user enrolling in an account recovery service or an identity verification service can operate her personal device to collect "action data" while the user performs a sequence of actions. Depending on implementation, the sequence of actions can include traversing a specific route from one place to another, moving the user device in a particular pattern selected by the user, invoking a device function (e.g., playing a song selected by the user, calling or texting a specific person selected by the user, launching an app selected by the user, taking a specific action within an app, taking a photo), presenting a biometric identifier (e.g., fingerprint, the user's face, a voice sample of the user saying something) to a sensor of the user device, and so on. Any sequence of actions that the user can repeat at a later time can be used. Using various onboard sensors, the user's device can capture "action data" of various kinds as the user performs the sequence. For example, if the user traverses a route, action data can be generated using GPS sensors and/or an accelerometer. Where the user is walking (or otherwise moving with a particular gait), action data representing the user's gait (e.g., stride length, cadence, ground force, etc.) can also be captured. If the user moves the device around, action data representing the movement can be generated using an accelerometer. For a text or call, action data can include a phone number of the recipient or the like. If an app is launched, action data can include a coded value indicating which app was launched. If a photo is taken, action data can include the fact of taking a photo and/or data based on the content of the photo (e.g., results of an image analysis algorithm). Other examples are described below. Action data collected across the entire duration of the action sequence can be defined such that it constitutes a secret that only the user can reliably reproduce.

Figure 1:
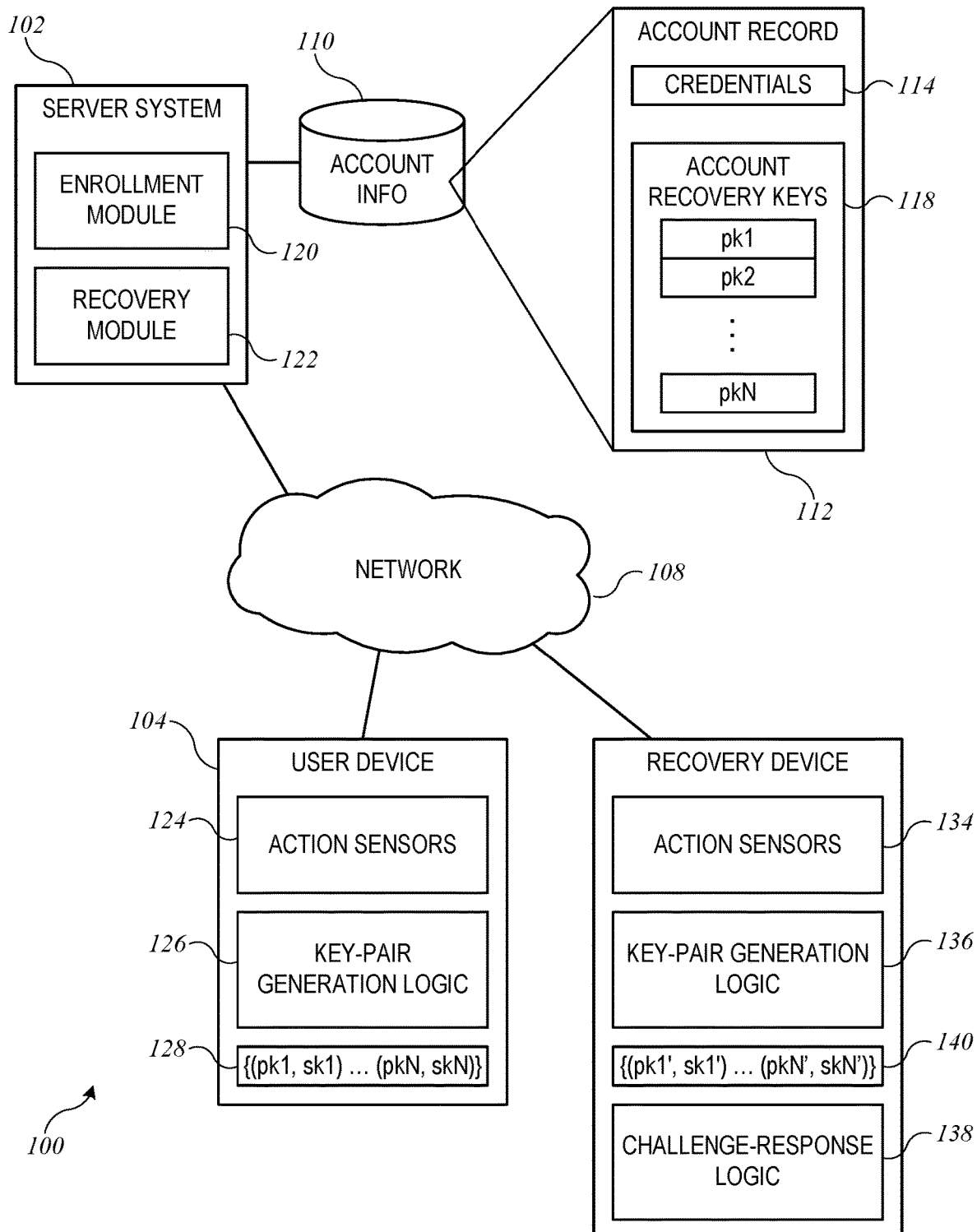
FIG. 1 shows a system according to an embodiment of the present invention.

FIG. 1 shows a system 100 according to an embodiment of the present invention. System 100 can include a server system 102 communicating with a user device 104 and a recovery device 106 via a network 108. Network 108 can be a wide-area network, e.g., the Internet.

Server system 102 can include a server or server farm operated by or on behalf of a service provider. Depending on implementation, the service provider can be capable of providing various types of service to users. For example, the service provider can provide "cloud-based" data storage and retrieval services (e.g., data backup services, storage of large files, storage of shared files), commercial services (e.g., purchasing of goods), communication services (e.g., email, text messaging, instant messaging), social media services (e.g., blog hosting, microblogging, etc.), financial services (e.g., banking or payment services), media access services (e.g., streaming music and/or video) or any other type of service that a user may interact with on a repeat basis.

To facilitate repeat interactions, a user operating user device 104 can establish a user account with server system 102. Server system 102 can maintain user account information in an account information repository 110, which can be implemented, e.g., using mass storage devices and database management software. User account information for a specific user account can be stored, e.g., in a user account record 112. As shown, user account record 112 can include account credentials 114. Account credentials 114 can include, for instance, a username (or login ID) and password for the account, which can be established when the user creates the account. For instance, the user can be prompted to provide a username and password that the user is expected to remember. In some embodiments, the password can be treated as a protected secret that is not transmitted as cleartext and is not stored as cleartext by server system 102. In some embodiments, the user may be able to update account credentials 114 from time to time (e.g., changing the password). In a "normal" login procedure defined for server system 102, user device 104 can present account credentials 114 to server system 102 and thereby obtain access to services offered through server system 102. The normal login procedure can incorporate conventional authentication processes and/or other processes as desired.

In addition to account credentials 114, user account record 112 can also include account recovery data such as a set of N "recovery keys" 118 (for an integer N that can be selected by the operator of server system 102 as described below). Each recovery key in set 118 can be a "public key" usable in a public-key cryptography operation. Recovery key set 118 can be generated during an enrollment process, examples of which are described below. In some embodiments, other recovery data can also be stored, such as a random salt that was used to generate the N key pairs. Stored recovery data can include various other data that may be needed to regenerate the N key pairs but that by itself is not sufficient to do so (or to increase the probability of doing so by chance). Subsequently to enrollment, if a user becomes unable to access the account through the normal login procedure using account credentials 114, recovery key set 118 (and other stored recovery data, if any) can be used in a recovery process that, if successful, allows an authorized user to re-establish access to the account through the normal login procedure (e.g., by establishing new account credentials 114). Examples of recovery processes are described below. It is to be understood that user account record 112 can also include or reference other information not shown (e.g., user contact information, transaction history information, stored data, and any other type of information that may be relevant depending on the particular services associated with the user account); details of such information are not relevant to the present disclosure.

Server system 102 can incorporate various logic modules, each of which can be implemented in program code executed on suitable hardware. The logic modules can support interaction of user device 104 and/or recovery device 106 with server system 102. For example, server system 102 can incorporate an enrollment module 120 and a recovery module 122. It is to be understood that server system 102 can also incorporate other modules implementing specific services that may be supported by server system 102 (e.g., catalog browsing, purchasing, querying a database, streaming media, publishing content, etc.); details of such modules are not relevant to the present disclosure.

Enrollment module 120 can be invoked to allow a user to establish an account and/or to enroll in an account recovery service. In some embodiments, the enrollment process can include user device 104 generating recovery key set 118 and providing this information to server system 102 to be stored in account record 112. Recovery module 122 can be invoked at a later time to allow a user who is unable to use the normal login procedure to access the account to attempt to re-establish access by demonstrating sufficient knowledge of a set of private keys corresponding to the public keys in recovery key set 118. Specific examples of enrollment and recovery processes are described below.

User device 104 can include any type of user-operable electronic device that is capable of communicating with server system 102 via network 108. For example, user device 104 can be a desktop computer, laptop computer, smart phone, other mobile phone, tablet computer, wearable computing device, or the like. User device 104 can include one or more action sensors 124 capable of capturing data related to user actions or action sequences, examples of which are described below. Examples of action sensors 124 can include accelerometers, gyroscopes, GPS receivers, light sensors, image sensors, user input devices (e.g., a touch-sensitive display), fingerprint sensors, audio sensors, and so on. Any number and combination of action sensors 120 can be present.

User device 104 can also include key-pair generation logic 126. Key-pair generation logic 126 can be implemented, e.g., in program code that can be supplied to user device 104 by server system 102 and executed on user device 104. For example, when the user establishes an account with server system 102 or opts to enroll in an account recovery (or identity verification) service of server system 102 that uses action data, server system 102 may prompt the user to download and install an application program that implements key-pair generation logic 126 (and in some instances other operations related to interacting with server system 102). In some embodiments, an operator of server system 102 may be affiliated with a manufacturer of user device 104, and key-pair generation logic 126 can be provided, e.g., as a component of operating system software installed on user device 104. In some embodiments, key pair generation logic can be implemented in hardware.

In operation, key-pair generation logic 126 can receive action data (e.g., in digital form) from action sensor(s) 124 as the user performs an action sequence and can use the action data to generate a set of N public/private key pairs 128. As described below, key-pair generation can be performed such that neither the action data nor the action sequence that generated the action data is recoverable from the public/private key pairs 128. When the user enrolls in the account recovery service, e.g., by operating user device 104 to interact with enrollment module 120 of server system 102, key-pair generation logic 126 can be invoked as part of the enrollment process. Specific examples are described below. User device 104 can transmit the public keys {pk1 ... pkN} of the generated key pairs 128 (and other information such as a random salt used to generate the key pairs, but not including the private keys {sk1 ... skN}) to enrollment module 120 to be added to user account record 112. In some embodiments, a user may have the option to re-enroll, in which case, key-pair generation logic 126 can be invoked again to generate a new set of public/private key pairs 128. User device 104 can communicate the new public keys to enrollment module 120, which can replace the previously stored public keys with the new set. As described below, user device 104 does not need to retain any of the public keys or private keys generated by key-pair generation logic 126. Instead, as described below, new key pairs can be generated later and used for recovery.

Recovery device 106 can be any device that can interact with recovery module 122 and with a user to facilitate recovery of access to a user account. In some embodiments, recovery device 106 can be similar or identical to user device 104 (e.g., any electronic device of the user). In some embodiments, recovery device 106 can be a device located in a controlled environment. For example, recovery device 106 can be located in a retail store or other location where an individual trusted by the service provider can monitor the user's behavior during the recovery process and can perform independent confirmation of the user's identity (e.g., by checking the user's driver's license or other identification card). The presence of a trusted individual during the recovery process can help to prevent impostors from attempting to fool recovery module 122.

Recovery device 106 can include one or more action sensors 134, which can be similar in design and operation to action sensors 124 of user device 104. For reasons that will become apparent, it may be desirable to use the same sensor types in both devices. Thus, for instance, in some embodiments, such as where recovery device 106 is located in a controlled environment and may be used by different users who established their recovery keys 118 on different devices with different sensors, recovery device 106 can implement different sensors compatible with different user devices 104. Alternatively, the controlled environment can provide a number of different recovery devices 106, each matched to a different type of user device 104 (e.g., different generations of a particular line of smart phones).

Recovery device 106 can also include key-pair generation logic 136. Key-pair generation logic 136 can be implemented in program code that can be supplied to recovery device 106 by server system 102. Key-pair generation logic 136 can be identical in its operation to key-pair generation logic 126, at least to the extent that the same input data set yields the same set of public/private key pairs.

Recovery device 106 can also include challenge-response logic 138. Challenge-response logic 138 can be used to support a zero-knowledge probabilistic ("ZKP") proof protocol via which recovery device 106 (acting as the "prover") can prove to recovery module 122 of server system 102 (acting as the "verifier") that it is in possession of a set of private keys that match account recovery (public) key set 118, to an acceptable level of confidence that both sets of key pairs were generated from the same underlying action data, without transferring any knowledge of the action data from the prover to the verifier. For instance, recovery device 106 may be required to prove that it is in possession of at least a minimum fraction of the key pairs. Examples are described below.

In operation, a user who wants to recover access to an account represented by account record 112 can perform an action sequence with recovery device 106, attempting to match the action sequence that was performed at enrollment time. Action sensors 134 can generate action data based on the action sequence. Key-pair generation logic 136 can generate a new set of public/private key pairs 140, using the action data generated by action sensors 134 and the same algorithms used by key-pair generation logic 126. Challenge-response logic 138 can use the private keys of the new set of key pairs 140 to respond to challenges posed by recovery module 122. Recovery module 122 can evaluate the responses using the stored public key set 118.

Because the private keys used by challenge-response logic 138 and stored public key set 118 were (presumably) generated based on two different performances of an action set and because it is very difficult for a human being to repeat a performance exactly, it is likely that new public/private key set 140 will not be identical to enrollment public/private key set 128, even if the same user performed the action set in both instances. Accordingly, recovery module 122 can implement a zero-knowledge probabilistic ("ZKP") proof protocol that permits a nonzero error rate in the responses from challenge-response logic 138. For example, the protocol can require recovery device 106 to prove that it has possession of at least a minimum number K of the N private keys, for some K<N. Recovery module 122 can, for instance, generate a set of N random challenge messages, each to be signed by recovery device 106 using a different one of its private keys. Based on the responses, recovery module 122 can make a match or no match determination for each key and can require that matches are achieved for at least K of the N keys. The value of K can be selected such that the risk of granting account access to someone who is not in fact the authorized user is reduced to an acceptable level. Those skilled in the art will recognize that the exact definition of acceptable risk will depend on the implementation (e.g., what type of information is stored in the user account or what type of transactions a user can perform with server system 102); some relevant factors and examples are described below.

It will be appreciated that system 100 is illustrative and that variations and modifications are possible. For instance, while one user device, one recovery device, and one user account record are shown, it is to be understood that any number of user devices, any number of recovery devices, any number of users, and any number of user account records can be present. A given user can have one or more user devices 104 via which the user accesses server system 102. A user with multiple user devices 104 can enroll in account recovery using one device 104 and does not need to enroll separately on every device. The particular choice of action sensors and action sequences can be varied; examples are described below.

Figure 2:
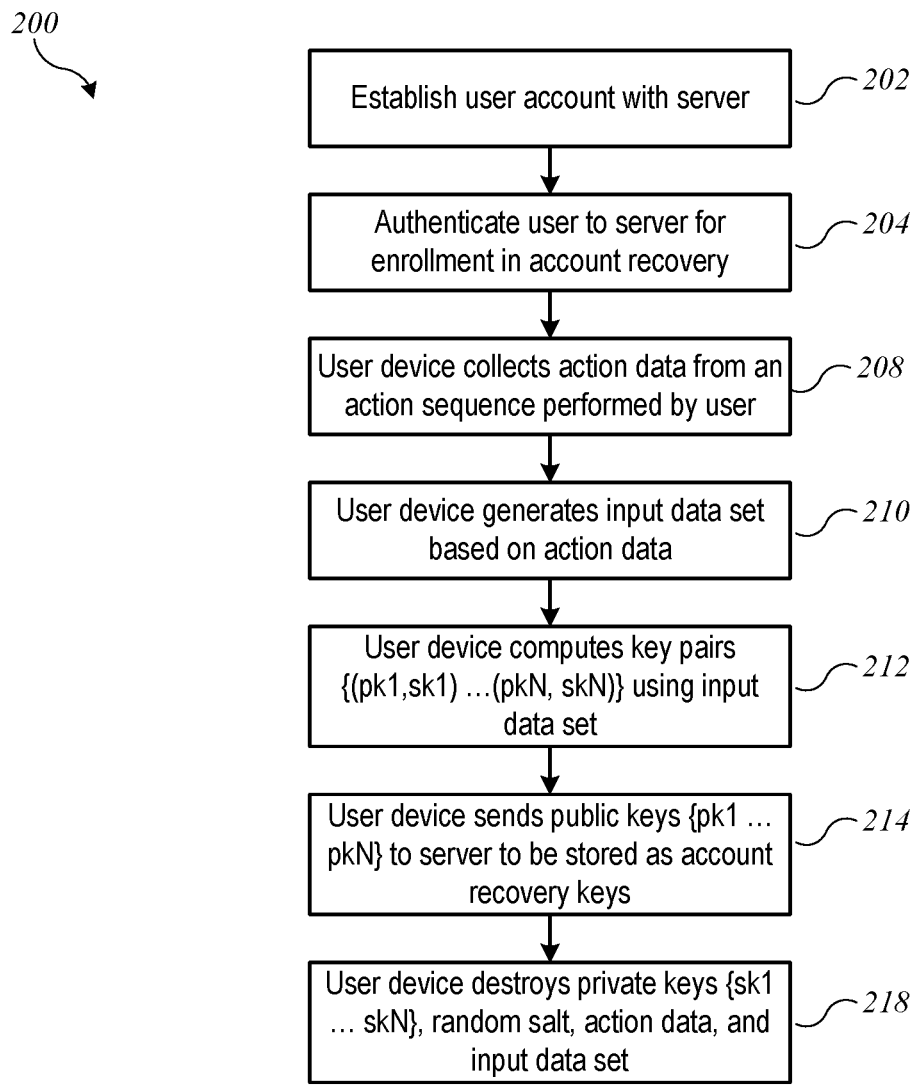
FIG. 2 shows a flow diagram of an enrollment process according to an embodiment of the present invention.

FIG. 2 shows a flow diagram of an enrollment process 200 according to an embodiment of the present invention. Enrollment process 200 can be implemented, e.g., on user device 104 interacting with enrollment module 120 of server system 102. Through execution of enrollment process 200, the user can establish a set of key pairs that can be later used to verify the user's identity.

Process 200 can begin at block 202, when a user account is established with server system 102. Establishing an account can include, e.g., user device 104 communicating with server system 102 to establish account credentials 114 (e.g., username and password) usable for a normal login procedure and to provide other user-specific information that may be requested or required by server system 102 (e.g., name, street address, email address, etc.). At block 204, which can be performed as part of establishing the account or at a later time as desired, the user can be authenticated to server system 102 for purposes of enrolling the user in account recovery, e.g., using account credentials 114 established at block 202. Enrollment in account recovery can happen at any time when server system 102 can establish satisfactory confidence that it is communicating with the authorized user of the user account, during or after account creation as desired. In some embodiments, authentication for purposes of enrolling the user in account recovery at block 204 can include additional actions beyond the normal login procedure. For instance, server system 102 can send a message including a random code to a device or email address associated with the user account and require the user to prove receipt of the message, e.g., by entering the random code into user device 104. Other authentication techniques can be used, and in some embodiments, a normal login procedure may suffice.

Once the user has been authenticated to server system 102, at block 208, user device 104 can collect action data for the user using action sensor(s) 124.

The particular data collection process can be varied, depending on the type(s) of action sensor(s) being used and the particular action sequence. It is contemplated that an action sequence can include any combination of actions that a user can perform repeatably and that the user device can detect. Examples of actions and associated action data will now be described.

One type of action the user can repeatably perform is traversing a route. For example, the user can go to a starting point, which can be selected by the user. The starting point can be the user's home or any other location the user is likely to have access to at a future date. Once at the starting point, the user can provide input to user device 104 indicating that this is the starting point for a route-traversing action. The user can then begin to traverse the route (e.g., by walking, jogging, or rolling a wheelchair). The user can freely choose where and whether to turn and can continue to an ending point also selected by the user (the ending point can be but need not be the same as the starting point). At the ending point, the user can provide input to user device 104 indicating that the ending point has been reached.

As the user traverses the route, user device 104 can capture data pertaining to the activity. For example, location information can be captured using a GPS sensor and various algorithms to record a "track" representing the path taken by the user. The track can include routing information: distance traveled between turns, locations where the user turned, the direction of a turn, etc. If user device 104 does not have a GPS sensor, relative location information can be collected, e.g., using an accelerometer to infer distance traveled; it may also be possible for user device 104 to infer the absolute location based on detected Wi-Fi network signals or the like.

In addition, as the user is traversing the route, user device 104 can measure physiological properties that the user might not be directly aware of, such as properties of the user's gait. For instance, user device 104 can determine an average speed for traversing the route or a portion thereof, the user's average stride length, cadence (rate of taking steps), ground force (i.e., the force with which the user's foot strikes the ground), and so on; known techniques for measuring athletic performance can be applied. Such properties may be repeatable, although not necessarily precisely. In some embodiments, user device 104 can prompt a user, at some point during traversal of a route to move in a specific manner for a short time, which may increase the repeatability of gait measurements, e.g., coaching the user to "walk as fast as you can for the next 10 seconds" or "walk heel-to-toe for 20 steps" or the like.

Another type of action the user can repeatably perform is "waving" the device. For example, the user can hold the device in her hand (or wear it) and move her wrist, arm, or entire body in a specific pattern, such as drawing a "figure-8" in the air, turning in a circle, swinging her arms in time to music, performing dance movements, tapping the device against a surface in a particular pattern, and so on. For example, when the user is ready to begin a waving action, the user can provide input to user device 104 indicating that a waving action is about to commence, then begin performing the action. As the user performs the action, user device 104 can capture data pertaining to the action, e.g., using an accelerometer and/or gyroscopic sensor. Examples of data that can be captured include the motion path or pattern, speed of motion, any impacts that may occur (e.g., user taps the device or taps the device against a surface), grip position, etc. The user can continue the action as long as desired and can provide express input to user device 104 that the action is ended. In some embodiments, user device 104 can infer the end of a waving action, e.g., based on cessation of intentional movement for a minimum period of time (e.g., three seconds).

Another type of action the user can repeatably preform is presenting a specific biometric identifier to a sensor of user device 104. For example, a user can present the tip of a particular finger to a fingerprint sensor, or the user can present her face to a camera of user device 104 for analysis to capture facial features, or the user can say something into a microphone of user device 104 that can be used to generate a voice print for the user. Action data in this case can include the biometric data as well as the user's selection of a particular biometric identifier.

Another type of action the user can repeatably perform is playing a particular song. Action data associated with playing a song can include an identifier of the song and/or audio samples excerpted from the song. Playing a song, in isolation, may not seem to be a particularly strong secret; however, when combined with other sources of randomness as described below, it can provide a component of a secret action sequence.

Another type of action the user can repeatably perform is taking one or more photos. Action data associated with taking a photo can include the fact of taking a photo, the number of photos taken, the camera orientation (e.g., the spatial orientation of user device 104) when the photo is taken, and/or data derived from analyzing the image content of the photo(s). In addition, a motion path of the device associated with taking the photo can provide a source of action data. The user may, for instance, remove the device from a pocket and bring the device around her body to position and orient the camera (this can be similar to waving the arms, although the motion in this case may be more natural, less deliberate). As with playing a song, taking a photo can be combined with other sources of randomness in a secret action sequence.

Another type of action the user can repeatably perform is sending a text message to someone (or some other form of communication, such as calling or sending email). Action data associated with sending a text message can include, e.g., a coded identifier of the recipient (e.g., a hash of the recipient's phone number, email address, and/or name) and/or a coded representation (e.g., a hash) of the message content.

Another type of action the user can repeatably perform is interacting with an app on the user device. For example, the user might launch a web browser and navigate to a particular web page (e.g., by entering a URL or selecting from a favorites list or the like). Or the user might launch a photo browsing app and select a particular photo from a stored collection. Associated action data can include, e.g., an identifier of the app and/or information about the specific action taken (e.g., the URL of the web page visited or an identifier of the selected photo).

In some embodiments, multiple actions can be combined to generate a secret action sequence (sometimes referred to as a spatio-temporal secret). For example, the user can traverse a route and pause at various points along the route to perform some other action, such as waving the device in a pattern, taking a photo of a stationary object (e.g., a building or other structure that is unlikely to move, allowing the photo to be repeated later) or of herself (e.g., for facial recognition analysis), playing a particular song (which might be played for the entire duration of traversing the route, or any portion thereof), sending a text to someone, and so on. The user can be given freedom to decide how long the route should be and how many and which other actions to perform while traversing the route. User device 104 can collect action data for any action initiated by the user while traversing the route (actions clearly not initiated by the user, such as incoming calls, can be ignored). The action data can be used to construct a "spatio-temporal" secret that the user can reconstruct by traversing the same route and performing the same actions along the way. Anyone attempting to impersonate the user would have a difficult time reconstructing the spatio-temporal secret. For example, the impersonator would have to know the route and all the actions the user took along the way. Further, some of the action data can incorporate biometric and/or physiological characteristics of the user, such as fingerprints, facial features, gait characteristics and the like; such characteristics may be extremely difficult for an impersonator to duplicate, even if the impersonator knows everything else. It should be understood that action data can be collected locally on user device 104 and need not be communicated to or shared with any other device.

Figure 3:
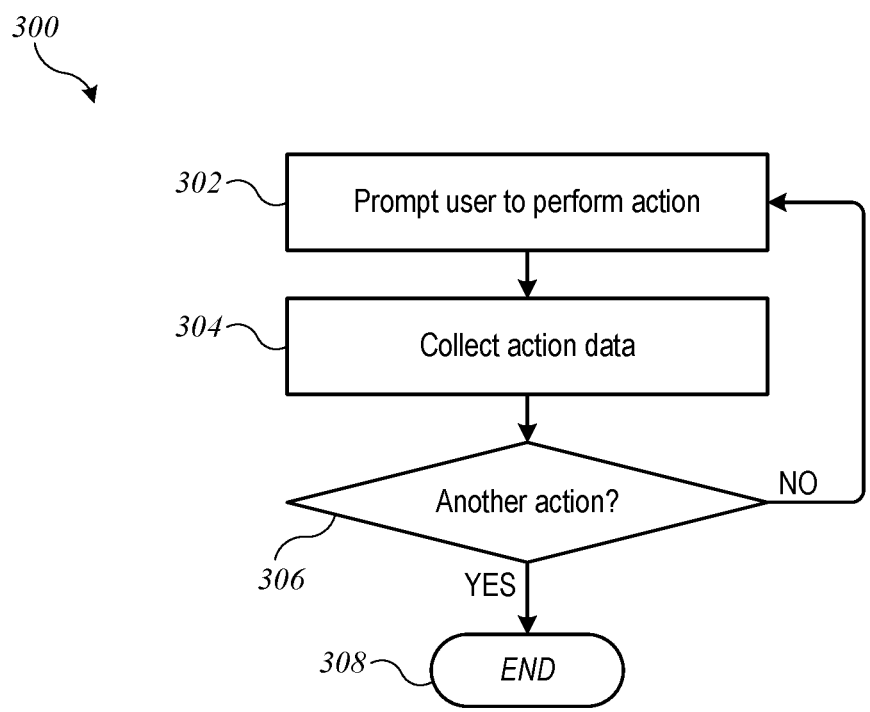
FIG. 3 shows a flow diagram of a data collection process according to an embodiment of the present invention.

FIG. 3 shows a flow diagram of an action data collection process 300 according to an embodiment of the present invention. Process 300 can be implemented, e.g., in user device 104 executing block 208 of process 200. In some embodiments, process 300 can allow the user to determine the duration and number of actions in the action sequence, with or without prompts from user device 104.

Process 300 can begin when the user is ready to perform an action sequence. For example, the user can indicate that she is at the starting point of a route to be traversed. At block 302, user device 104 can prompt the user to perform an action. For example, the user may be prompted to begin traversing a route. In some embodiments, the prompt can include a request to indicate the type of action to be performed or a suggestion to perform a particular action.

At block 304, user device 104 can collect action data for an action initiated by the user in response to the prompt at block 302. The particular data collection process can depend on the particular action and available action sensor(s) 124 and can include any process that generates a digital representation of one or more distinctive characteristics of the action that can help to distinguish the action from other actions of a similar type. For example, depending on the action, any of the characteristics described above can be represented using digital data.

At block 306, user device 104 can determine whether the action sequence is continuing (e.g., with another action). For example, if the action sequence is associated with traversal of a route, user device 104 can continue to collect action data until the user indicates that the route has ended. In some embodiments, block 306 can include prompting the user to indicate whether to capture data for another action. If the end of the action sequence has not been reached, process 300 can return to block 302 to continue to collect action data. Once the end of the action sequence is reached, process 300 can end at block 308. It is to be understood that action sequence can have any length and can incorporate any number of action types. It should also be understood that action data can be collected locally on user device 104 and need not be communicated to or shared with any other device.

In some embodiments, process 300 can be designed to accumulate, through the user's performance of the action sequence, an action data set that has high entropy and is reproducible (to a significant degree, not necessarily exactly) by the user if the user repeats the action set. For example, entropy in a data set can be increased by increasing the number of possible outcomes, and to some extent, entropy can be increased just by increasing the number of actions in the action sequence. Other techniques can also be used to increase the entropy without requiring the user to do anything else. To take just one example, in the selection of a song to play, there can be a large number of possible outcomes to the user's selection of a song. Entropy in the resulting action data can be further increased by introducing additional (reproducible) sources of randomness into the generation of action data from a selected song. For instance, based on a numerological algorithm applied to the user's name or a user account identifier, user device 104 can select a specific audio sample or set of audio samples from the song to be used as action data corresponding to the action of playing the song. Different users (with different names) can thus generate different action data by playing the same song. Or, for example, one user action in the action sequence can be used to determine selection of action data for another user action in the same action sequence. For instance, if the action sequence includes playing a song and sending a text, the phone number of the person texted can be the basis for selecting audio samples from the song.

At the same time, it is also desirable to make it difficult for anyone other than the user to reproduce the action data. A certain level of difficulty can be inherent in the fact that the user can perform the action sequence for enrollment without anyone else knowing when or where it is happening, making it difficult for someone to learn the action sequence by observation. Further difficulty can be introduced by incorporating biometric and/or physiological characteristics of the user into the action sequence. For instance, the collection of action data can include prompting the user for specific actions to ensure that biometric and/or physiological data is recorded. Such actions can include providing a fingerprint, face, or voice print; walking at least a minimum distance to support gait analysis from which measurements of user-specific gait characteristics can be extracted, and so on. It is to be understood that a single biometric or physiological characteristic need not be unique to the user, but a combination of such characteristics along with other idiosyncratic features of the action sequence can result in an action data set that is extremely difficult for anyone other than the user to reproduce.

After completion of process 300 (or other action data collection processes), enrollment process 200 can continue. Referring again to FIG. 2, at block 210, user device 104 can generate an input data set based on the action data collected at block 208. Generating the input data set may include, e.g., applying normalization or scaling factors to various data values, or performing other transform operations. Generation of the input data set can preserve a correlation between the action data and the input data set such that different action data produces a different input data set while the same action data produces the same input data set. In some embodiments, the input data set can be generated by key-pair generation logic 126.

At block 212, user device 104 can compute a set of N key pairs $\{(pk1, sk1), \ldots (pkN, skN)\}$ using the input data set generated at block 210 and the random salt generated at block 206. (In the notation used herein, "pki" for integer i denotes a public key and "ski" denotes the corresponding private, or secret, key.) Conventional (or other) algorithms for computing a cryptographic key pair for use in public key cryptography operations can be used, and the same algorithm (or different algorithms) can be repeated N times, using different (possibly overlapping) subsets of the input data set to generate N key pairs. The key generation process can be deterministic (such that the same input data set with the same random salt produces the same set of N key pairs) but unpredictable (such that any change to the input data set or random salt produces a different set of N key pairs, where the differences between the sets of key pairs cannot be used to reconstruct what the difference in the inputs was). In some embodiments, an additional random salt (and/or other data to seed the key-pair generation algorithm that is not usable by itself to reproduce the key pairs) can be introduced. In some embodiments, the action data itself can supply sufficient randomness (in the sense the same user can generate a completely different set of action data by performing a different action sequence), and the introduction of an additional random salt or other seed data is not required. In any case, the key generation process can be such that the input data set is not recoverable from the resulting key pairs even if the key-pair-generation algorithm is known.

The number (N) of key pairs can be selected as desired. As described below, the key pairs can be used in a zero knowledge probabilistic (ZKP) proof protocol in which a recovery device demonstrates possession of at least a threshold fraction of the key pairs. The number of key pairs and the threshold fraction together define a degree of confidence that the recovery device has the authorized user's biometrics. Accordingly, a large number of key pairs (e.g., $N \geq 100$) can be generated. In choosing N, consideration can also be given to the size of the "space" of possible key pairs, as defined by the amount of entropy in the input data set (roughly corresponding to the number of possible distinct input data sets). If N is a significant fraction of the size of the space of possible key pairs, then the risk of a false positive in the ZKP proof occurring just by chance increases correspondingly. If the space of possible key pairs is large (e.g., $2^{128}$ or $2^{256}$), then N=100 or N=1000 can result in an acceptably small risk of false positive occurring by chance.

The selection of input data sets can be managed on a per-key-pair basis to increase the likelihood that the user will be able to reproduce a significant fraction of the key pairs by repeating the action sequence at a later time while still making it difficult for anyone other than the user to reproduce a sufficient fraction of the key pairs to "fool" server system 102. It is expected that some action data will be more reliably reproducible than other action data. For instance, an audio sample selected from a song is exactly reproducible, as is a phone number of a person to whom a text was sent. A GPS track generated from traversing a route is highly reproducible, though perhaps not exactly due to limitations on GPS receiver accuracy. A specific gait characteristic may be less reproducible, although this can be compensated somewhat by using various statistical techniques to compensate for fluctuations (e.g., using a statistical distribution of ground-force or stride-length measurements across a large number of strides) or by using data gathered when the user was prompted to walk in a particular manner (e.g., as fast as possible or heel-to-toe or the like). In some embodiments, more reliably reproducible data can be incorporated as input data into more of the key pairs, or a statistical distribution of less-reproducible data can be used to determine a proportional number of key pairs to generate using more-reproducible data. In some embodiments, different (possibly overlapping) subsets of highly reproducible biometric data (e.g., facial feature data, fingerprint data, voiceprint data) can be incorporated into a significant fraction of the key pairs to help thwart impostors. Other techniques can also be used.

At block 214, user device 104 can send just the public key of each pair, i.e., $\{pk1, \ldots pkN\}$, to server system 102 to be stored as recovery key set 118. If an additional random salt or other seed data was used, user device 102 can also send that data to server system 102 to be stored for later use as described below. In some embodiments, the only information sent by user device 104 to server system 102 during process 200 is the set of public keys. The private keys and the action data from which they were computed need not leave user device 104. Thus, provided that the public keys cannot be used to reconstruct the action data, the privacy of the action data (including any biometric information contained therein) is protected against any attack on server system 102.

At block 218, user device 104 can destroy the set of private keys, i.e., $\{sk1, \ldots skN\}$, the action data collected at block 208 and the input data set generated at block 210; any random salt or other seeds that were used for key-pair generation can also be destroyed. Any process that results in unrecoverable loss of this information can be used. Consequently, after completion of process 200, the only way to obtain private keys $\{sk1, \ldots skN\}$ would be by repeating blocks 208-212 of process 200, including having the same individual perform the same action sequence. Assuming the goal is to prevent unauthorized parties from gaining access to the user's account, this is a desirable state of affairs, as it is likely to be much more difficult for an unauthorized party to match or reconstruct the user's action data than to hack into a user device or server where private keys (or private user data usable to generate private keys) are stored. User device 104 can also destroy the public keys {pk1, . . . pkN} after sending them to server 102, as they are no longer of any use to user device 104. Thus, the privacy of the action data (including any biometric information contained therein) can also be protected against any attack on user device 104.

Following completion of process 200, user device 104 can continue to access server system 102 using account credentials 114 in a normal login procedure (as defined by server system 102). Server system 102 can permit such access, e.g., for as long as server system 102 is not notified of any potential breach that may compromise the security of account credentials 114. Thus, there may be instances where a user creates a recovery key set 118 but never uses it.

There may also be instances where recovery is desirable. For instance, the user may forget some or all of account credentials 114 or lose a user device where they were stored (or otherwise lose access to the credentials). Additionally, various "lockout" events may occur, where a lockout event can include any occurrence that results in server system 102 denying all access to the user account via the normal login procedure, such that even presenting the correct account credentials 114 does not result in the user gaining access. Lockout events can occur, for example, if the operator of server system 102 receives information (from the user or other sources) indicating that an unauthorized party may have gained (or attempted to gain) access to account credentials 114 (e.g., by stealing a password list or a user device on which account credentials 114 were stored), or if a suspicious pattern of activity on the user account is detected, and so on. Where a lockout event occurs, the user may desire to recover, or reestablish, access to the user account. Accordingly, certain embodiments of the present invention provide an account recovery process using account recovery keys 118, via which the user can recover access to the user account, e.g., after a lockout event or loss of account credentials.

Recovery can be performed using a recovery device 106, which can be a different device from user device 104 that was used to create account recovery key set 118. For example, the user may have lost user device 104 (which may have resulted in the lockout event) and may now be using a different device. As another example, it may be desirable to require the user to go to a "controlled" location at which the user can be observed by an individual trusted by the provider of server system 102 while presenting biometric identifiers during the recovery process. For instance, if server system 102 is affiliated with a retail operation, the user may be required to go to a retail outlet to perform account recovery in the presence of a person employed at the retail outlet.

Figure 4:
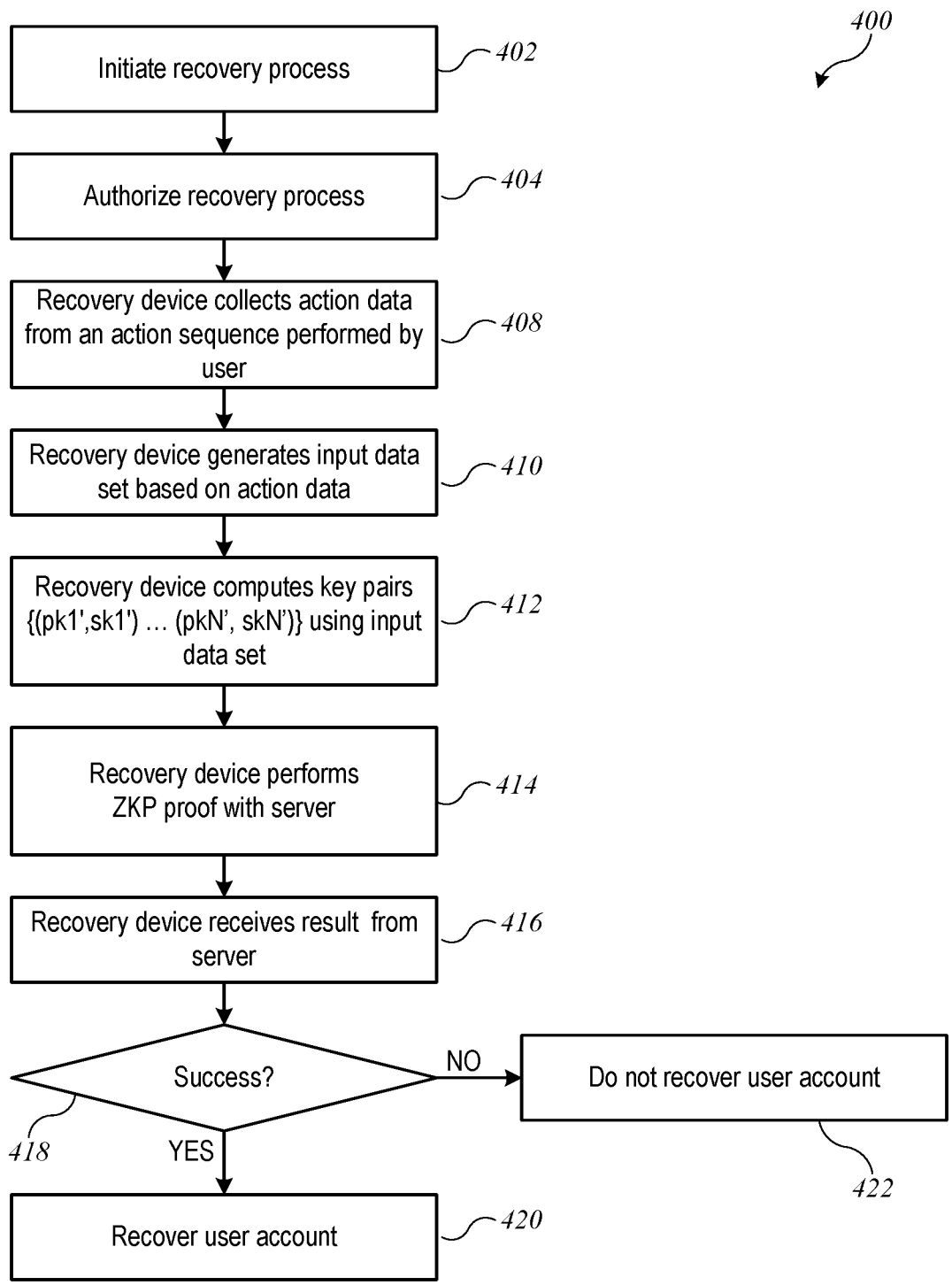
FIG. 4 shows a flow diagram of an account recovery process according to an embodiment of the present invention.

FIG. 4 shows a flow diagram of an account recovery process 400 according to an embodiment of the present invention. Process 400 can be implemented, e.g., on recovery device 106 interacting with recovery module 122 of server system 102. Through execution of recovery process 400, the user can establish her identity as the authorized user of an account for which recovery key pair set 118 was previously generated (e.g., by executing process 200 described above).

Process 400 can begin at block 402, when the user indicates to recovery device 106 that a recovery process should be initiated. Recovery device 106 can be, for instance, the same device as user device 104 (but executing a recovery process rather than an enrollment process), a replacement for user device 104, or a device provided to the user for purposes of executing a recovery process by an individual trusted by the provider of server system 102. (For instance, if server system 102 is affiliated with a retail operation, the user may be required to go to a retail outlet to perform account recovery after having her claimed identity confirmed by a person employed at the retail outlet to whom the user can present a driver's license or other identification card.)

At block 404, recovery device 106 can perform an authorization operation with server 102 to authorize the recovery process. For example, recovery device 106 can provide account credentials 114 for the account to be recovered; providing the account credentials can be a necessary but not sufficient condition for recovering an account. Alternatively, since the user may have lost the account credentials, recovery device 106 can provide any information usable to identify the user account record 112 for which recovery is being attempted (e.g., the name of the user, address of the user, phone number of the user, etc.). In some embodiments, a second authentication factor may be used to confirm the recovery operation in addition to or instead of the account credentials. (This can be useful, for instance, where the user has lost or forgotten the account password, or where an unauthorized party has maliciously changed the account password to keep the user out.) For instance, server 102 can send a message to the user's device or to the user's email account (as determined from account record 112) with a confirmation code that is then entered into recovery device 106 to allow the operation to proceed. (This may not be an option, e.g., if the user has lost the device or has been locked out of the email account.) In some embodiments, in addition to or instead of evidence of user authorization, the authorization operation at block 404 can require an indication of approval from a trusted individual (e.g., a retail store employee), who can be prompted to enter an approval code or the like to verify that the recovery operation is authorized. In some instances, the trusted individual can be expected (e.g., as matter of policy) to confirm the user's identity through some other form of identification prior to indicating approval; for instance, the user may need to present a driver's license or other identification card to the trusted individual, who can confirm that the name on the identification card matches the name associated with the account being recovered. It should be understood that in some embodiments, authorization can fail at block 404, in which case process 400 can end without recovering the user's account.

At block 408, recovery device 106 can collect action data from an action sequence performed by the user. For example, recovery device 106 can perform process 300 to collect data while the user performs the same action sequence that was used to generate recovery key set 118 during enrollment process 200. In some embodiments, the success of recovery process 400 may depend on the user's ability to remember the action sequence. Accordingly, the sequence can provide an additional level of security, as any impostor would very likely not know the sequence. In some embodiments, to help the user remember, the user may have the option to create "breadcrumbs" while performing the action sequence during enrollment. The breadcrumbs can include user-entered information (e.g., typed text or voice memo) or information automatically generated by user device 104 that can provide a hint as to what comes next, without giving too much away. For example, the user may create a list of steps (e.g., "touch finger, play song, draw in the air") that may help the user remember the order of actions without enabling anyone else to figure out the correct action. As another example, the user may create an ambiguous prompt such as "grab some greens," which could mean many things (e.g., picking up a purse, walking to a salad restaurant, doing pushups on the lawn, performing a "downward facing dog" yoga posture on a favorite green mat, or something else entirely); the user can remember what is meant but others would not know. The breadcrumbs can be stored on user device 104 (and lost if user device 104 is lost) or on server system 102; in the latter case, block 408 can include retrieving the breadcrumbs from server system 102. Whether server system 102 stores and/or retrieves breadcrumbs is a matter of design choice. Where breadcrumbs are supported, block 408 can include presenting the breadcrumbs to the user.

At block 410, recovery device 106 can generate an input data set based on the action data collected at block 408, and at block 412, recovery device 106 can compute a set of N "new" key pairs $\{(pk1', \ldots sk1'), (pkN', \ldots skN')\}$ using the input data set generated at block 410. The same algorithms used at blocks 210 and 212 of process 200 can be used at blocks 410 and 412 of process 400, so that if exactly the same biometric data is collected by the sensors in both instances, new key pairs $\{(pk1', sk1'), \ldots (pkN', skN')\}$ will exactly match the "enrollment" set of key pairs $\{(pk1, sk1), \ldots (pkN, skN)\}$ generated by process 200, the public keys of which are stored by server system 102 as recovery keys 118. If a random salt or other seed data was used to generate the key pairs, that data can be retrieved from server system 102 for use at block 410.

As a practical matter, it may be unlikely that the action data collected during enrollment process 200 and the action data collected during recovery process 400 will be exactly the same. For example, collection may be performed using physically different devices with different sensors, and some level of device-to-device variation can be expected. In some embodiments, calibration processes may compensate for at least some device-to-device variation. In addition, it is expected that the user will not be able to identically reproduce the action sequence in minute detail; for instance, the user might walk (or perform other movements) faster or slower at different times depending on energy level, state of mind, injury, or other uncontrollable factors. Other variations, such as variations in any captured images due to changing light levels or somewhat different camera position relative to the subject, are also expected. To some extent, this can be addressed by using measurements that are relatively insensitive to changes of this kind. However, it is assumed that, while obtaining data that is very similar is possible, obtaining exactly identical data is not to be expected, particularly where the action data incorporates biometric and/or physiological characteristics. Consequently, it is assumed that while new key pairs $\{(pk1', sk1'), \ldots (pkN', skN')\}$ might not exactly match the enrollment set of key pairs $\{(pk1, sk1), \ldots (pkN, skN)\}$, at least some fraction K/N can be expected to match if the person attempting recovery is the same person who previously completed enrollment.

Accordingly, the determination whether to recover the user's account access can be based on recovery device 106 proving, to the satisfaction of server system 102, that it is in possession of the user's action data (which by assumption would be the case only if the user repeated the enrollment action sequence to an acceptable approximation). More specifically, at block 414, recovery device 106 can perform a ZKP proof with server system 102. In some embodiments, the proof can be based on recovery device 106 demonstrating its possession of a set of key pairs that is "close enough" to stored public keys $\{pk1, \ldots pkN\}$), where "close enough" is defined using a criterion that makes it unlikely that recovery device 106 could possess K or more correct key pairs without also possessing the user's action data. For example, "close enough" can be defined based on how many and/or which ones of the stored public keys recovery device 106 has been able to reproduce. To find out how many and which ones of the stored public keys recovery device 106 has been able to reproduce, server system 102 can issue a set of challenges to recovery device 106, where each challenge can include a random string to be digitally signed using a specified one of the private keys (or to be signed using a specified sequence of different private keys). In some embodiments, the set of challenges can be structured such that each of the N private keys is used to sign at least one challenge; for instance, there can be N challenges, each to be signed with a different private key. Recovery device 106 can use its key pairs $\{(pk1', ski'), \ldots (pkN', skN')\}$ to respond to the set of challenges. Server system 102 can use its stored public keys $\{pk1, \ldots pkN\}$ to evaluate whether each response is correct or incorrect. Based on the responses, server 102 can reach a conclusion as to how many (and which ones) of the correct public keys are possessed by recovery device 106. Thus, server 102 can determine how many (and which ones) of the N public keys have been successfully recreated without acquiring any knowledge as to the correct private keys, as to what private keys recovery device 106 has, or as to the underlying action data (or action sequence). In this context, the standard of proof can be satisfying a confidence threshold set by server 102 that correct responses are due to the prover's knowledge of the action data and not just due to chance. Setting of a confidence threshold is described below.

Based on the responses, server 102 can determine whether the ZKP proof results in success (examples of how server 102 can make the determination are described below). At block 416, recovery device 106 can receive the result of the ZKP proof from server system 102. If, at block 418, the result is success, then the user's account can be recovered at block 420. For example, recovery device 106 can prompt the user to establish a new password (and/or other account credential(s) 114) with server 102 that will allow the user to resume accessing the account through the normal login procedure. If, at block 418, the result is failure, then at block 422, the user account is not recovered. In some embodiments, the user can be allowed to try recovery process 400 again. Server system 102 can place an upper limit on the number of recovery attempts.

In any case, recovery device 106 can destroy the action data at any point after generating the key pairs and can destroy the key pairs once the ZKP proof has been completed (regardless of outcome). It should be noted that, similarly to the enrollment process, the action data can be collected and used to generate key pairs locally on recovery device 106, and action data need not be communicated to or shared with any other device. Further, since the same key-pair-generation algorithm is used for both enrollment and recovery, the action data is again not recoverable from the key pairs.

Figure 5:
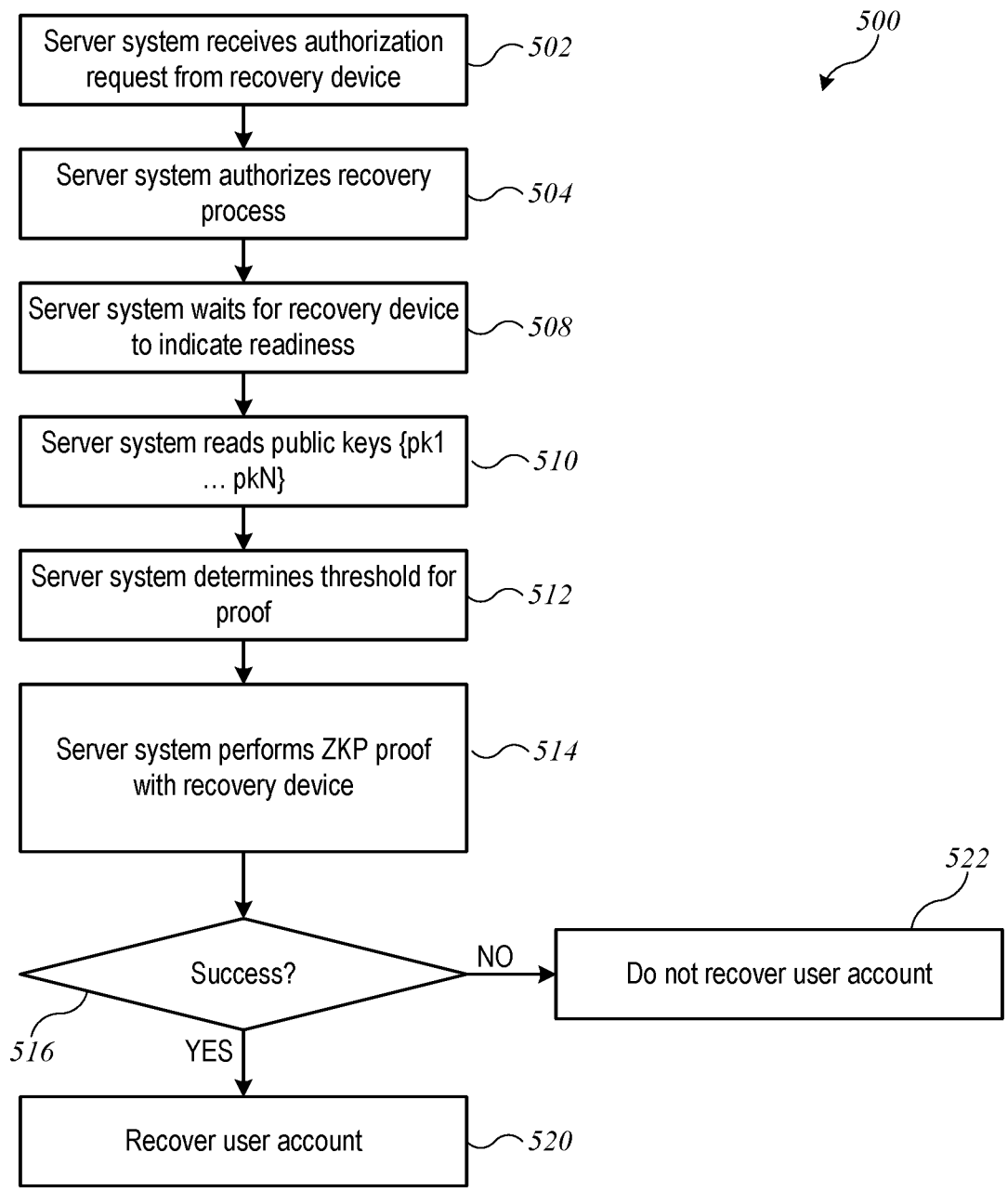
FIG. 5 shows a flow diagram of an account recovery process that can be implemented in a server system according to an embodiment of the present invention.

FIG. 5 shows a flow diagram of an account recovery process 500 that can be implemented in server system 102 (e.g., in recovery module 122) according to an embodiment of the present invention. Process 500 can be performed, e.g., while recovery device 106 is performing process 400.

Process 500 can begin at block 502, when server system 102 receives an authorization request from recovery device 106 (e.g., during execution of block 404 of process 400). At block 504, server system 102 can authorize the recovery process to proceed. As described above, server system 102 can perform various interactions to obtain authorization from the user and/or a trusted individual. This can include any or all of: verifying the user's account credentials (e.g., username and optionally password); sending a confirmation request (e.g., email or text message) to the user based on the user's stored account information and receiving a confirmation response via recovery device 106; receiving an approval code from a trusted individual; or other operations. In some embodiments, server system 102 can determine the requirements for successful authorization at block 504 depending on the specific reason for performing recovery. For instance, if the user lost a device, then sending a confirmation request message to the user's lost device would not be chosen; if the user is locked out of an email account, then sending an email message to that account would not be chosen. As another example, if recovery device 106 is in a controlled location, all that may be needed is the user's name or email address and the approval code from the trusted individual (who can be trusted to verify the user's identity prior to initiating recovery). It should be understood that if authorization fails at block 504, process 500 can end, and server system 102 can so inform recovery device 106, which can result in process 400 ending at block 404.

At block 508, recovery process 500 can wait for recovery device 106 to indicate that it is ready to proceed. For example, it may take some time for recovery device 106 to collect the biometric data and generate key pairs. During this time, server 102 can keep a connection to recovery device 106. Recovery device 106 can signal its readiness, e.g., after completing key-pair computation at block 412 of process 400.

At block 510, recovery process 500 can read stored public key set 118 from user account record 112. At block 512, recovery process 500 can determine a threshold for proof that recovery device 106 will be required to meet in order to prove its possession of the user's action data using a ZKP proof. The particular threshold can be implementation-dependent. In the example described above, where the proof is based on recovery device 106 demonstrating knowledge of key pairs generated from the action data, a scoring formula based on how many and/or which of the N key pairs recovery device 106 can demonstrate possession of can be defined, and the threshold can be established as a minimum score. Various scoring formulas can be used. For example, the score can simply be the number of keys matched, and sufficient knowledge can be defined as possession of at least a threshold number K of the N key pairs.

Other scoring formulas can be defined, rather than simply counting keys matched. For example, the definition of a threshold can be based on knowledge about the algorithm(s) used to generate the N key pairs, such as which types of action data contribute to each key pair. It may be the case that not all key pairs are equally difficult to reproduce, and a threshold of proof can be based on a scoring formula that takes into account differences in difficultly of reproducing different key pairs.

For example, as noted above, key pairs can be generated using various combinations of highly-reproducible data and less-reproducible data. Consequently, certain ones of the N key pairs may be more reliably reproducible than others. Server system 102 can treat different key pairs as having different significance, depending on how strongly it is expected that the user repeating the action sequence should result in reproducing a particular key pair. For instance, server system 102 can divide the key pairs into a "more-reproducible" subset and a "less-reproducible" subset and can apply a different minimum threshold to each. For instance if the more-reproducible subset includes N1 key pairs and the less-reproducible subset includes N2 key pairs, server system 102 can require that recovery device show possession of at least K1 of the more-reproducible key pairs and K2 of the less-reproducible key pairs, where (K1/N1)>(K2/N2), i.e., more "misses" can be allowed in the less-reproducible subset. This can be extended to any number of subsets.

As another example, each key pair can be assigned a corresponding weight, based on reproducibility of that key pair, and the scoring formula can be based on the sum of weights of the matched keys. Nonlinear scoring algorithms can also be used. As another example, the set of key pairs can be modeled as a vector in a high-dimensional space, and a distance metric or the like can be defined based on matching or failing to match a particular key pair. In some instances, there may be a subset of the key pairs that is expected to be 100% reproducible if the user repeats the action sequence, and that subset can be used as a "veto," in the sense that if all key pairs in the subset are not matched, then the proof cannot succeed, regardless of anything else.

Given a particular scoring formula, a threshold score for proof can be selected by server system 102. The selection of a threshold score can be based on various considerations. For instance, the risk of false positives (i.e., where someone who is not the user succeeds in fooling the ZKP proof) decreases with increasing the threshold score while the risk of false negatives (i.e., where the actual user fails the ZKP proof) increases with increasing threshold score. An optimum value can balance the risk of false positives against the risk of false negatives. In some embodiments, the selection of threshold score can be based in part on a risk profile for the user. For example, the threshold score can be raised or lowered based on a history of user behavior recorded by server system 102, history of past attempts to hack the user's account (whether successful or not), and so on. In some embodiments, the selection of the threshold score can be based in part on the particular recovery device 106 being used; for instance, the threshold score can be lower if recovery device 106 is in a controlled environment and a trusted individual has indicated confirmation of the user's identity. Other considerations can include the reason for recovery. For instance, a forgotten password may result in a lower threshold score than a stolen device or a password that has been compromised.

At block 514, server system 102 can perform a ZKP proof with recovery device 106 to determine whether recovery device 106 achieves the threshold for proof established at block 512. The ZKP proof can be performed, e.g., using a set of challenges as described above, to determine how many and which ones of the N correct key pairs are possessed by recovery device 106, determining a score using the applicable scoring formula, and determining whether the score reaches the threshold for proof.

At block 516, server system 102 can determine the outcome of the ZKP proof. If, at block 516, server system 102 determines that recovery device 106 succeeded (e.g., that recovery device 106 demonstrated possession of sufficient knowledge of the N private keys corresponding to recovery public keys 118), then the user's account can be recovered at block 520. For example, server system 102 can send a request to recovery device 106 to provide a new password (and/or other account credentials); after receiving and storing new account credentials 114, server system 102 can remove any lockout protections that were preventing credentials 114 from being used, allowing the user to resume accessing the account through the normal login procedure. If, at block 516, the result is failure, then at block 522, the user account is not recovered. Server system 102 can notify recovery device 106 of the failure. In some embodiments, server system 102 can keep track of the number of unsuccessful recovery attempts and can use this number, e.g., to adjust the scoring threshold or for other operations (e.g., permanently locking out the account or destroying some or all information stored in the account to protect user secrets).

It will be appreciated that the processes described above are illustrative and that variations and modifications are possible. Steps described as sequential may be executed in parallel, order of steps may be varied, and steps may be modified, combined, added or omitted.

The particular action sequences and the amount and type of action data extracted from an action sequence can all be modified as desired. Those skilled in the art with access to the present disclosure will appreciate that protection against false positives can be increased by selecting action data that provides a large pool of entropy, such that accidental matching between the key pairs generated during the recovery process and the key pairs generated at enrollment time has low probability. This may weigh in favor of longer action sequences, collecting more action data from a given action, and/or making sure that the action sequence includes multiple different types of actions. Further, if the user selects the sequence, entropy can be further increased if the action data includes information as to the order of events. That is, a sequence where the user first takes a picture of herself and then moves the device in a figure-8 can produce different results from a sequence where the user first moves the device in a figure-8 and then takes a picture of herself, even if the sequences are otherwise identical. Thus, allowing the user to select the actions and the sequence of performing the actions can increase the difficulty of an impostor successfully recovering the user's account.

Further, other types of actions can be used in addition to or instead of the examples described. In general, anything a user can do that a user device can measure in some way that distinguishes (at least to some degree) different types of actions and/or the same type of action performed by different users, can be incorporated into an action sequence. Biometric identifiers can be incorporated. For example, biometrics can be based on analysis of fingerprints, facial features, ear features, or other anatomical structures. Another type of biometric measurement can be a voice print, where the user speaks a phrase or sentence to generate a distinctive sonic pattern. Where voice prints are used for key generation as described herein, the user may select the phrase or sentence to speak, which can further increase the entropy. Biometric inputs can be incorporated at any point within an action sequence, and the user can have the option to select a biometric identifier and the point in the sequence at which it will be presented. In some instances (e.g., where GPS coordinates are incorporated into the action data or where the action sequence includes taking a picture of a particular building or the like), the user may need to return to a specific location to reproduce the action sequence, and in some instances, the action sequence can include the user going outdoors (e.g., walking around the block or through a park or a neighborhood or the like). However, other types of action sequences can be used. For instance, the user can perform an action sequence within the home or within a single room (an accelerometer or gyroscopic sensor can measure movement of the device within a room even if GPS data is not reliable at that scale). In some embodiments (e.g., where GPS coordinates or other absolute location indicators are incorporated into the action data), the user may need to go to the same location to reproduce the action sequence. Some embodiments can omit absolute location information from the action data, and in that case, the user can reproduce the action data by performing the same action sequence in any location.

It should also be noted that the processes described herein can protect the privacy of the action data (including any biometric data that may be collected). As described, in enrollment process 200 and recovery process 400, the device that collects the action data can generate cryptographic key pairs based on the action data, after which the action data can be destroyed. Action data need not be received by server system 102; instead, as described, server system 102 can perform account recovery using only the public keys (which, by design of the key-generation algorithm, can be unusable to reconstruct the action data, or any underlying biometrics, even approximately). Thus, in some embodiments, action data is never shared by the user device that collects it, and action data does not need to be stored on the user device for any longer than required to generate key pairs.

In addition, the foregoing description makes reference to cryptographic key pairs as an example of data that can be generated from an input data set such that the input data set is not recoverable from the output. Cryptographic key pairs also have, by design, the useful property of providing a straightforward mechanism for zero-knowledge proof; that is, the prover can prove possession of a key pair to a verifier that has only the public key by using the private key to digitally sign a "challenge" issued by the verifier. If the verifier can use the public key to recover the challenge, then the verifier can be confident that the prover has the private key.

However, embodiments of the present invention are not limited to using traditional cryptographic key pairs. As described above, the user's performance of an action set can produce action data, which can be understood as a large set of numbers (e.g., on the order of a million bits), and at a more general level, the purpose of the ZKP proof in processes 400 and 500 can be understood as demonstrating to server system 102 (the verifier) that recovery device 106 (the prover) knows that set of numbers, without transferring any knowledge of the set of numbers to server system 102. Generating and using cryptographic key pairs in the manner described above can accomplish this purpose.

Other techniques can also be used, and the invention is not limited to cryptographic key pairs. For example, a function (or set of functions) can be defined that produces, from the large set of numbers, a "public representation" that includes a set of information items derived from the large set of numbers (i.e., the action data). A public representation generated during enrollment can be stored by server system 102 and later used to evaluate whether recovery device 106 has possession of a significant fraction of the original large set of numbers, for instance by requiring recovery device 106 to "closely" reproduce the public representation and to prove that it has done so to a degree that meets the definition of closeness in use in a given context. In some embodiments, the function(s) used to convert to the public representation can deviate from standard cryptographic functions (where a result is either correct or incorrect; there is no degree) in that the function can provide a non-binary metric for "nearness" between information items in the original public representation and information items generated later in an attempt to replicate the original large set of numbers. Such a metric can be incorporated into defining criteria for determining whether recovery device 106 has sufficient knowledge of the large data set.

Further still, in some instances, a public representation might not be needed. For instance, using the techniques described above, a user can perform an action sequence using a device. The device can collect action data based on the user's performance of the action sequence. This action data can constitute a "secret" that has the property of being approximately (but not exactly) reproducible when the user performs the same action sequence again. Such a secret can be securely stored with the user device and later used by the device itself to verify the user identity. For instance, if the user device detects too many (e.g., 3 or 5 or some other number) consecutive unsuccessful attempts to enter a passcode for unlocking the device, the device can prompt the user to perform the action sequence and thereby recover access to the device. In this case, the user device can simply compare the new action data to the stored action data, without computing a public representation or taking other measures to conceal the action data from itself.

In the examples described above, process 400 is described as being performed in situations where the user is unable to access the account through a normal login procedure and is attempting to recover such access. However, use of the techniques described herein is not limited to recovery situations; processes 400 and 500 (or similar processes) can be used in any context where user identity verification is desirable for any reason, and the result of successfully completing the ZKP proof in processes 400 and 500 can be something other than recovering the user's account access.

Figure 6:
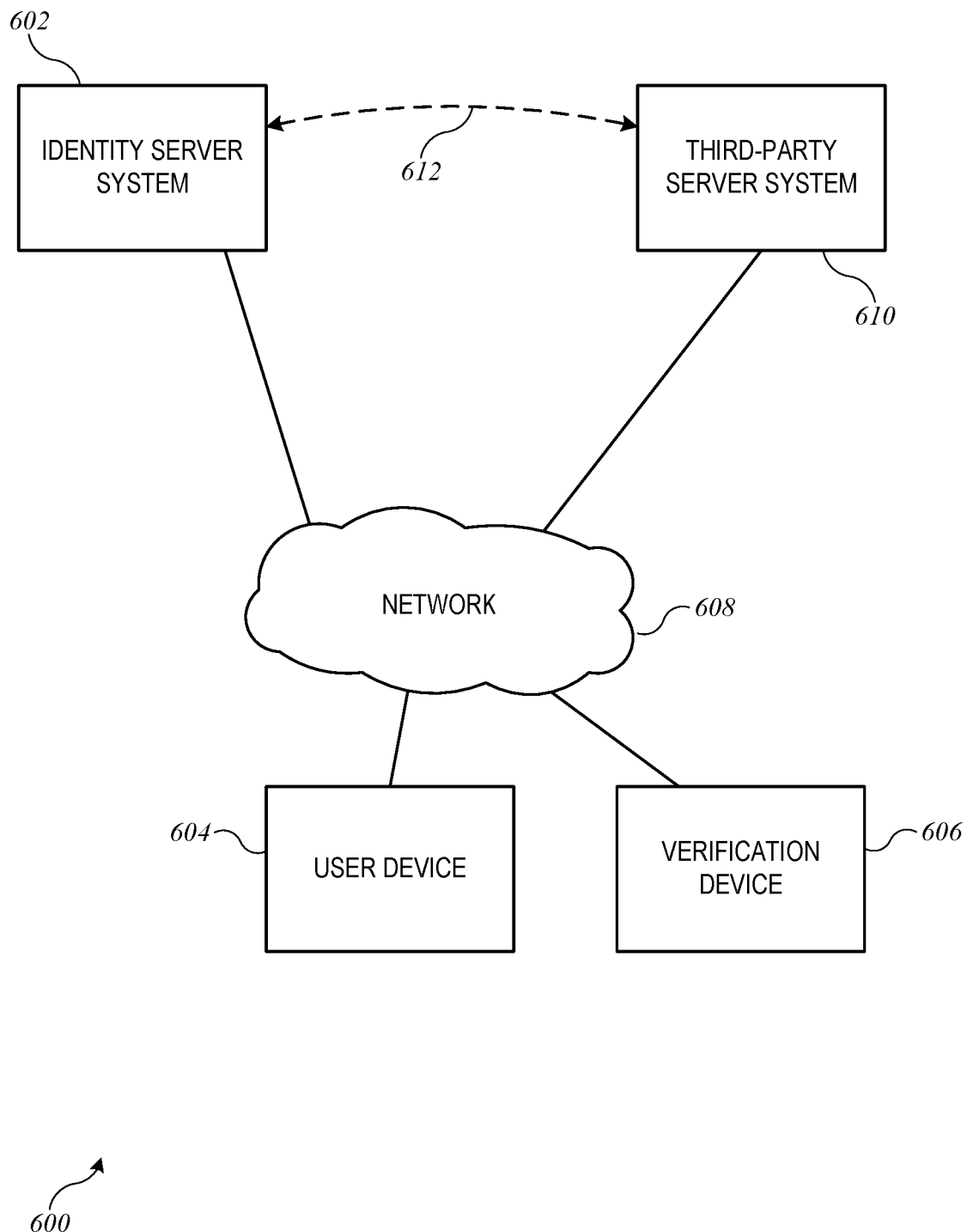
FIG. 6 shows a system according to an embodiment of the present invention.

For example, in some embodiments, server system 102 can provide an identity verification service to other server systems, including server systems operated by otherwise unrelated third parties. FIG. 6 shows a system 600 according to an embodiment of the present invention. System 600 can include an identity server system 602, a user device 604, a verification device 606, and a third-party server 610 communicating via a wide-area network 608 (e.g., the Internet).

Identity server system 602 can be similar or identical to server system 102 described above; user device 604 can be similar or identical to user device 104 described above; and verification device 606 can be similar or identical to recovery device 106 described above. For instance, user device 604 can be operated to enroll the user in an identity verification service offered by identity server system 602. The enrollment process that can be similar or identical to process 200 of FIG. 2. Recovery device 606 (which can be user device 604 or a different device, depending on the particular implementation) can be operated to perform an identity verification process for the user with identity server system 602. The identity verification process can be similar or identical to processes 400 and 500 described above, with the difference being that in the context of an identity verification service, success can result in identity server system 602 generating a "user identity certification" for the user. Specific examples are described below.

Third-party server system 610 can be any server system that has established a trust relationship (as indicated by dashed line 612) with identity server system 602. It is to be understood that there can be multiple different third-party server systems 610 provided and operated by various third parties that need not have any particular connection with the provider or operator of identity server system 602. A trust relationship between third-party server system 610 and identity server system 602 can be established using conventional (or other) techniques for establishing trust between computer systems, such as exchanging digital certificates signed by a trusted authority that can be used to authenticate subsequent communications between the systems, establishing a virtual private network (VPN) between the systems, or any other techniques that allow either server system to confirm (to the satisfaction of that system's operator) that a communication purportedly from the other system really did originate there and was not altered in transit. The particular mechanism for establishing and maintaining a trust relationship can be negotiated between the respective providers of identity server system 602 and third party server system 610.

In some embodiments, identity server system 602 can provide an identity verification service to third-party server system 610. For example, identity server system 602 can, at the request of third-party server system 610 (or user device 604, depending on implementation) perform an identity verification process to verify a user's identity, then transmit the resulting user identity certificate to third-party server 610 in a manner such that third-party server 610 can verify that the user identity certificate was generated for the user by trusted identity server system 602. Third-party server 610 can accept the user identity certification as verification of the user's identity, e.g., for purposes of transactions involving third-party server system 610.

In one example scenario, third-party server system 610 can belong to a bank that offers online access to banking services via an application program (or "app") that can be executed on a user's mobile device. The bank may want to verify that a user attempting to access information about a given bank account is in fact the account holder, e.g., if the user is using the app for the first time on a new device. Accordingly, when third-party server system 610 receives a request for access via the app and wants to verify the identity of the requester, third-party server system 610 can invoke an identity-verification operation of identity server system 602 and can rely on the result of this operation. In some embodiments, third-party server 610 can first communicate with the requester (e.g., through the app) to confirm that the requester is enrolled with identity server system 602; if not, third-party server system 610 can proceed with an alternative identity-verification protocol or deny access. For purposes of the present description, the case where the requester is enrolled with identity server system 602 is of interest.

Figure 7:
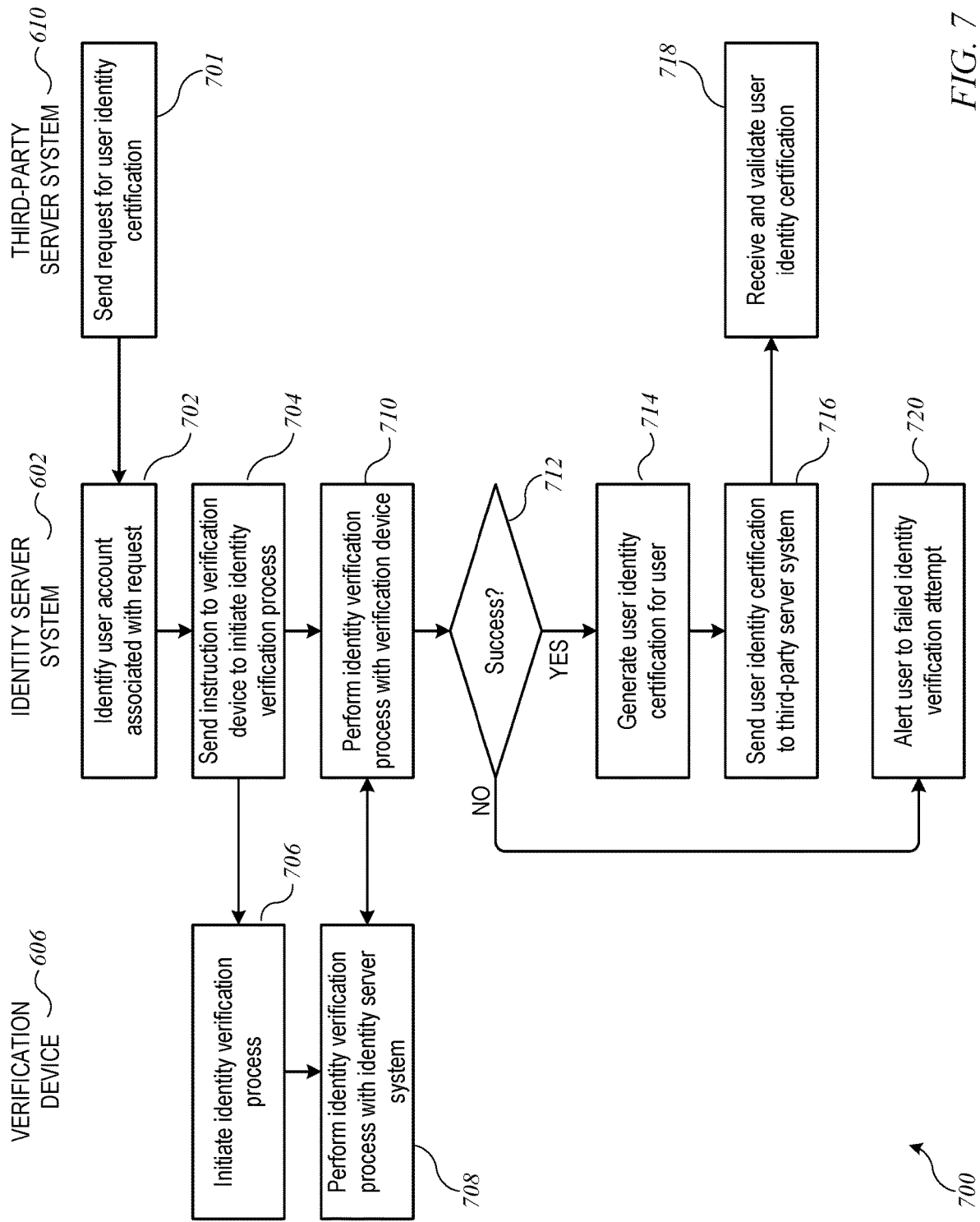
FIG. 7 shows a simplified flow diagram of a process for providing identity verification as a service according to an embodiment of the present invention.

FIG. 7 shows a simplified flow diagram of a process 700 for providing identity verification as a service according to an embodiment of the present invention. It is assumed that a user operating user device 604 has already established an account with identity server system 602 and has enrolled in an identity verification service offered by identity server system 602. It is also assumed that enrolling in the identity verification service includes executing process 200 or a similar process to generate a set of recovery (or in this case verification) key pairs $\{(pk1, sk1), \ldots (pkN, skN)\}$, the public keys $\{pk1, \ldots pkN\}$ of which have been stored by identity server system 602 as part of the user account record, as described above. Server 602 can subsequently use these keys to verify the user's identity. (It is to be understood that in some embodiments, a different public representation of an action sequence, such as action data, can be substituted for the key pairs.)

Process 700 can begin, e.g., at block 701 with a request from third-party server system 610 to identity server system 602 requesting a user identity certification. The request can specify the user for whom the certification is being requested (e.g., by reference to the user's name, email address, account identifier with identity server system 602, or other information that third-party server system 610 has about the user in question). The request can also include request-identifying information (e.g., a message ID and/or identifier of the third-party server system making the request).

At block 702, identity server system 602 can receive the request and can identify a user account associated with the request. For instance, identity server system 602 can extract user-specific information from the request (e.g., the user's name, email address, account identifier with identity server system 602, or other information provided by third-party server system 610) and can attempt to match the information to user information stored in a user account record (e.g., user account record 112 as described above). If a user account cannot be identified, identity server system 602 can so notify third-party server system 610, and process 700 can end with the user's identity not being verified. (At that point, third party server system 610 can take other steps as desired.)

Assuming a user account is identified, at block 704, identity server system 602 can send an instruction to a verification device 606 to initiate an identity verification process. In some instances, verification device 606 can be a personal device of the user and can be, e.g., the same device used to enroll in the identity verification service. In some embodiments, the user may be instructed to go to a controlled location (e.g., as described above) to perform the identity verification in the presence of a trusted individual. The particular implementation can depend on the degree of security desired and the particular nature of the action sequence (e.g., if the action data can only be reproduced at a specific location, sending the user to a controlled location may be counterproductive). Depending on implementation, the request may be sent to the user (e.g., via email or text message) with instructions on where or how to obtain physical access to verification device 606.

At block 706, verification device 606 can initiate an identity verification process with identity server system 602. Depending on implementation, various operations can be performed to initiate the process. For example, verification device 606 can prompt the user to perform a normal login process with identity server system 602. In cases where the verification is being performed in a controlled location, verification device 606 can prompt for and receive an access code from a trusted individual as described above. In some embodiments, operations at block 706 can be similar to blocks 402 and 404 of process 400 described above.

At blocks 708 and 710, verification device 606 can perform an identity verification process with identity server system 602. The identity verification process can be similar or identical to processes 400 and 500 described above, except that the result in this case is not recovery or non-recovery of access to the user account. Instead, at block 712, if identity server system 602 determines that verification device 606 successfully completed the ZKP proof, then at block 714, identity server system 612 can generate a user identity certification for the user. The user identity certification can include user-identifying information (e.g., the user's name, email address, or any other user-identifying information that was included in the request from third-party server system 610), any or all request-identifying information that was included in the request from third-party server system 610), a timestamp indicating when the certification was generated, a code or other information indicating that the user's identity was verified, and other information as desired. The user identity certification can be digitally signed by identity server system 602; other techniques can also be used to increase the difficulty of forging a user identity certification. It should be noted that the user identity certification need not contain any information about the action sequence, the action data, or the key pairs (or other public representation) generated from the action data.

At block 716, identity server system 602 can send the user identity certification to third-party server system 610. In some embodiments, the user identity certification can be sent over a secure channel (e.g., VPN or the like). In some embodiments, a public network can be used, and the user identity certification can be encrypted or otherwise protected against reading and/or modification by anyone other than third-party server system 610. In some embodiments, identity server system 602 can also notify the user that the user's identity has been certified to third-party server system 610. (This may allow the user to detect fraud, in the unlikely event of a false positive.)

At block 718, third-party server system 610 can receive and validate the user identity certification. Validation can include, e.g., decrypting the certification (if it was encrypted), verifying a digital signature of identity server system 602, validating a timestamp (e.g., to make sure the certification is recent), comparing user-identification information in the certification to expected user-identification information, comparing request-identification information in the certification to expected request-identification information, and so on. Assuming the certification is validated, third-party server system 610 can trust that the user is in fact who the user purports to be.

If, at block 712, identity server system 602 determines that verification device 606 did not successfully complete the ZKP proof, then at block 720, identity server system 602 can alert the user to the failed identity verification attempt. For example, identity server system 602 can send a text message or email message to a device or email account associated with the user account against which the unsuccessful attempt occurred. Thus, the user may learn that someone else is attempting to use her identity. Depending on implementation, identity server system 602 can also notify third-party server system 610 and/or verification device 606 of the failure.

It will be appreciated that system 600 and process 700 are illustrative and that variations and modifications are possible. Process described as sequential may be executed in parallel, order of steps may be varied, and steps may be modified, combined, added or omitted. For instance, the identity verification process at blocks 708 and 710 can allow for multiple attempts to be made (e.g., two attempts, three attempts or the like) before determining a result at block 712.

The sequence of events by which an identity verification process is initiated can also be varied, and different initiation sequences can be used in different instances. For instance, in one alternative initiation sequence, third-party server 610 can send a "start-verification" request to the user or to user's device (rather than to identity server 602), requesting that the user obtain a user identity certification from identity server system 602. In response to this start-verification request, the user or the user's device can initiate the identity verification process with identity server system 602 without identity server system 602 first receiving a request from third-party server system 610. Where this is the case, the user's device can provide the received start-verification request (or information extracted therefrom) to identity server system 602, allowing identity server system 602 to include request-identifying information and/or requester-identifying information that refers to third-party server system 610 in any user identity certification that may be generated.

Similarly, in some embodiments, identity server system 602 can provide the user identity certification to verification device 606, and verification device 606 can forward the user identity certification to third-party server system 610 for validation. Assuming that the user identity certification includes appropriate authentication and protection against reading and/or modification by anyone other than third-party server system 610, third-party server system 610 can trust the certification regardless of whether delivery path includes verification device 606.

In this manner, identity server system 602 can provide identity-verification services to any number of third-party server systems 610 operated by any number of third parties. In some embodiments, the provider of a particular third-party server system 610 can determine a desired security level, and this can, for example, influence the selection by identity server system 602 of the threshold or other criteria for defining sufficient knowledge or satisfactory proof of knowledge in the context of a ZKP proof as described above. Further, the provider of third-party server system 610 may be able to specify other conditions, such as whether the user can perform validation on a user device, or on a device at a controlled location (which can be a specific location selected by the provider of third-party server system 610). It is to be understood that different third-party service providers may be driven by different considerations and may therefore opt for different levels of stringency in the process, e.g., depending on the degree of risk involved if the user turns out not to be who she purports to be. In some embodiments, the stringency of the process may be determined entirely by the provider of identity verification server system 602.

Identity verification services provided by identity server system 602 can be used in any context where it is desirable for a third-party server system (or any other server system) to confirm a user identity using action sequences, without becoming privy to personal information about the user (e.g., biometric and/or physiological information). In some embodiments, third-party server system 610 can incorporate identity verification process 700 or a similar process into a "normal" login procedure (e.g., requiring a certification each time the user connects or logs in). In addition or instead, third-party server system 610 can incorporate identity verification process 700 into its own account recovery procedures, such that when a user attempts to recover an account with third-party server system 700, success or failure of the recovery attempt can depend at least in part on whether the user succeeds in generating a user identity certification from identity server system 602. Further, identity verification process 700 can be used in connection with providing brick-and-mortar services to an individual. For example, a user who appears in person at a bank to make a large withdrawal from an account can be required by the bank to perform identity verification process 700 or a similar process under the supervision of bank personnel. (This may not be applicable if reproducing the action sequence requires the user to go to a specific location.)

It should be noted that process 700 (or similar processes) can be performed without transferring any knowledge from identity server system 602 or verification device 606 to third-party server system 610, other than the outcome of the identity verification process. For instance, third-party server system 610 does not need to receive any of the action data or the public or private keys (or other information) generated therefrom. Further, in some embodiments, generation of the user identity certification can be performed such that the only user-identifying information included is information that was previously provided by third-party server system 610 in connection with the request. Thus, third-party server system 610 can perform process 700 without learning anything about the user other than whether the identity validation operation succeeded or failed. In some instance, this absence of knowledge can allow third-party server system 610 to reduce the amount of personal data it stores about its users, which can help to protect user privacy.

Figure 8:
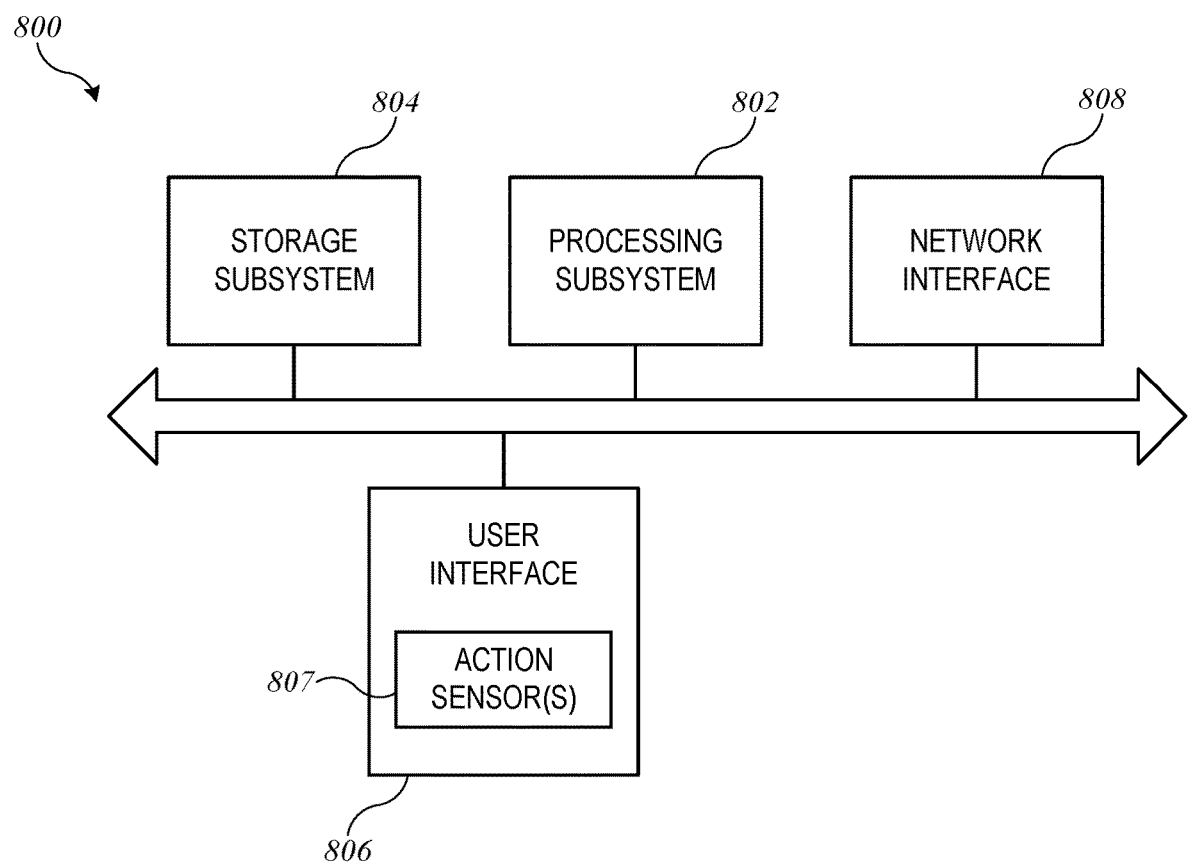
FIG. 8 is a simplified block diagram of a computer system that can be used in connection with an embodiment of the present invention.

Embodiments described herein can be implemented using computer systems that can be of generally conventional design. FIG. 8 is a simplified block diagram of a computer system 800 that can be used in connection with an embodiment of the present invention. In some embodiments, computer system 800 can implement any or all of the functions, behaviors, and capabilities described herein as being performed by a user device or recovery device (including user device 104 and recovery device 106 of FIG. 1), as well as other functions, behaviors, and capabilities not expressly described. In some embodiments, another physical instance of computer system 800 can implement any or all of the functions, behaviors, and capabilities described herein as being performed by a server (including server system 102 of FIG. 1).

Computer system 800 can include processing subsystem 802, storage subsystem 804, user interface 806, and network interface 808. Computer system 800 can also include other components (not explicitly shown) such as a battery, power controllers, and other components operable to provide various enhanced capabilities. In some embodiments, computer system 800 can be implemented in a consumer electronic device such as a desktop or laptop computer, tablet computer, smart phone, other mobile phone, wearable device, media device. household appliance, or the like. Computer system 800 can also be implemented in a large-scale architecture such as a scalable server system or server farm that can include many interconnected processors, storage systems and interfaces, capable of processing and responding to high volumes of requests from client devices (including user devices and/or recovery devices).

Storage subsystem 804 can be implemented, e.g., using disk, flash memory, or any other non-transitory storage medium, or a combination of media, and can include volatile and/or non-volatile storage media. In some embodiments, storage subsystem 804 can store one or more application and/or operating system programs to be executed by processing subsystem 802, including programs to implement any or all operations described herein as being performed by a user device or recovery device. For example, storage subsystem 804 can store program code implementing key-pair generation logic 126 (or key-pair generation logic 136, which can use the same program code), program code to process biometric sensor data, and/or program code implementing challenge-response logic 138 (in the case of a recovery device). In instances where computer system 800 implements a server, storage subsystem 804 can be implemented using network storage technologies and/or other technologies that can manage high-volume requests to large data stores. For example, storage subsystem 804 can store and manage user account information repository 110.

User interface 806 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). User interface 806 can also include one or more biometric sensors 807, such as a fingerprint sensor to generate data representing fingerprint patterns, a camera to capture images (e.g., of the user's face, ear, or other anatomical features), a microphone to capture the user's speech, and so on. In some embodiments, a user can operate input devices of user interface 806 to invoke functionality of computer system 800 and can view and/or hear output from computer system 800 via output devices of user interface 806. In instances where computer system 800 implements a server, user interface 806 (which can include, e.g., an operator console) can be remotely located with respect to processing subsystem 802 and/or storage subsystem 804.

Processing subsystem 802 can be implemented using one or more integrated circuits, e.g., one or more single-core or multi-core microprocessors or microcontrollers, examples of which are known in the art. In operation, processing subsystem 802 can control the operation of computer system 800. In various embodiments, processing subsystem 802 can execute a variety of programs in response to program code and can maintain multiple concurrently executing programs or processes. At any given time, some or all of the program code to be executed can be resident in processing subsystem 802 and/or in storage media such as storage subsystem 804.

Through suitable programming, processing subsystem 802 can provide various functionality for computer system 800. For example, where computer system 800 implements user device 104 or recovery device 106, processing subsystem 802 can implement various processes (or portions thereof) described above as being implemented by a user device or recovery device. Processing subsystem 802 can also execute other programs to control other functions of computer system 800, including other programs that may be stored in storage subsystem 804. Where computer system 800 implements server system 102, processing subsystem 802 can implement operations related to account enrollment and account recovery as described above, as well as other operations that may be supported or performed by server system 102.

Network communication interface 808 can provide voice and/or data communication capability for computer system 800. In some embodiments, network communication interface 808 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 808 can provide wired network connectivity (e.g., Ethernet) in addition to or instead of a wireless interface. Network communication interface 808 can be implemented using a combination of hardware (e.g., driver circuits, antennas, modulators/demodulators, encoders/decoders, and other analog and/or digital signal processing circuits) and software components. In some embodiments, network communication interface 808 can support multiple communication channels concurrently, using the same transport or different transports.

It will be appreciated that computer system 800 is illustrative and that variations and modifications are possible. User devices (and recovery devices) implemented using computer system 800 can be portable or non-portable as desired, and any number of user devices and/or recovery devices can communicate with a particular server system. Devices and/or server systems can have functionality not described herein (e.g., a user device may provide voice communication via cellular telephone networks; control mechanisms and/or interfaces for operating an appliance such as a thermostat or door lock; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. For instance, in embodiments described above, the user device and recovery device can be different devices. This can allow the user to recover account access even after the user device via which the user performed enrollment is lost, stolen, damaged, or destroyed. However, it is not required that a user use a different device, and in some embodiments, recovery can be performed using the same device that was used for account enrollment.

In some embodiments, the ability of a user to verify her identity using an action sequence may depend on the user's ability to recall the action sequence. To facilitate user recall, some embodiments may provide for the use of breadcrumbs as described above. In some embodiments, the user device that performed enrollment may prompt the user to review or rehearse the action sequence from time to time to help keep the user's memory fresh. The user device, for example, may retain information as to where the user performed the action sequence for enrollment; when the user is in that location and otherwise idle, the user device can prompt the user to rehearse the action sequence. Or the user may have the option to schedule periodic rehearsals.

When the action sequence is being rehearsed (i.e., performed for purposes of refreshing the user's memory), the user device can (but does not need to) collect data or perform any analysis on the data. In some embodiments, the user device can collect data and perform various analysis. For instance, if the user's gait is incorporated into the action data, the user device can analyze the user's gait and detect any drift across time and/or sudden changes (e.g., due to an injury). Depending on implementation, the user device may be able store gait-calibration data usable to compensate at verification time for any drift or change, or the user device may prompt the user to redo the enrollment process if the change becomes significant (i.e., likely to increase the difficulty of successfully completing the ZKP proof). In some embodiments, the user device can send updated gait data (e.g., data representing cumulative change in the gait) for the user to server system 102 periodically. Server system 102 can store this data and provide it to recovery and/or verification devices during the verification process, allowing other devices to compensate for gait changes.

In some embodiments, the user can be prompted to periodically redo the enrollment process. For example, it is expected that biometric and/or physiological identifiers (including but not limited to gait) may drift over time (e.g., due to effects of aging, random accidents, and such). Periodic regeneration of action-based recovery keys can increase the likelihood that the recovery process will successfully reconstruct a sufficient fraction of the key pairs; the same action sequence can be used, or the user can modify it. Also, over time, the user may forget the action sequence that was originally used, and periodically regenerating the recovery keys can make it more likely that the user will remember the action sequence when it is needed. As another example, in instances where action data incorporates location information, a user device may determine that the user no longer frequents the area where enrollment was performed and may prompt the user to re-enroll.

In some embodiments, a user may be permitted to have multiple concurrent enrollments of the same account, each with its own action sequence. For instance, server system 102 can store multiple independent sets of recovery keys in association with the same user account. For identity verification, the user can match any one of the sets of keys. This can be useful, for example, where action data incorporates location. A user can enroll once at home and once at work, and perform verification in either place, depending on what is convenient at a given time. In addition, if the user loses access to one enrollment location (e.g., due to a change in employment), the user may still be able to use another enrollment location for identity verification.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

An aspect of the present technology is the gathering and use of data available from various sources to verify an identity. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of identity verification, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Thus, although the invention has been described with respect to specific embodiments, it will be appreciated that the invention is intended to cover all modifications and equivalents within the scope of the following claims.

What is claimed is:

1. A method comprising:
collecting, at a first device belonging to a user, during an account recovery service enrollment process of a user account maintained at a server, a first action data set representing a first performance of an action sequence by the user,
wherein the first action data set is approximately reproducible by the user reperforming the action sequence,
wherein the action sequence comprises traversing a route comprising a starting point geographic location and an ending point geographic location designated by the user during the account recovery service enrollment process at a predetermined speed; and
preserving, by the first device, secrecy of the first action data set from any other device by capturing the first action data set at the first device.

2. The method of claim 1 wherein the first action data set includes data representing one or more of:
a location of the route;
a distance covered by the route;
a turn take during the route; or
a gait of the user while traversing at least a portion of the route.

3. The method of claim 1 wherein the action sequence includes the user intentionally moving the first device and the first action data set includes data representing one or more of:
a motion path of the first device;
a speed of a motion;
a grip of the user on the first device;
an impact force on the first device during the motion; or
a location where the motion was performed.

4. The method of claim 1 wherein the action sequence includes the user presenting a biometric identifier to the first device and the first action data set includes data representing one or more of:
an identifier type of the biometric identifier;
biometric data for the biometric identifier; or
a location where the biometric identifier was presented.

5. The method of claim 1 wherein the action sequence includes the user playing a song on the first device and the first action data set includes data representing one or more of:
a song identifier of the song;
an audio sample from the song; or
a location where the user played the song.

6. The method of claim 1 wherein the action sequence includes the user taking a photo using a camera of the first device and the first action data set includes data representing one or more of:
a device motion path associated with taking the photo;
a number of photos taken;
an orientation of the camera during taking the photo;
image content information extracted from the photo; or
a location where the photo was taken.

7. The method of claim 1 wherein the action sequence includes the user sending a communication to another person using the first device and the first action data set includes data representing one or more of:
an identifier of the other person;
content of the communication; or
a location where the sending occurred.

8. The method of claim 1 wherein the action sequence includes the user interacting with an app the first device and the first action data set includes data representing one or more of:
an identifier of the app;
information indicating a specific operation within the app; or
a location where an interaction occurred.

9. The method of claim 1, wherein the method further comprises:
generating, at the first device, a first set of N key pairs based on a first data set using a key generation algorithm, wherein a number N is greater than 1 and wherein each key pair in the first data set includes a public key and a private key; and
sending, by the first device to the server, the public key of each of the first set of N key pairs to be stored by the server in a user account information record for the user account.

10. The method of claim 9 further comprising:
destroying, by the first device, the private key of each of the N key pairs in the first set.

11. The method of claim 9 wherein collecting the first data set includes:
prompting, by the first device, the user to perform an action; and
operating a sensor to collect sensor data while the user performs the action.

12. The method of claim 11 wherein collecting the first data set further includes generating a portion of the first action data set based on the sensor data.

13. The method of claim 9 wherein collecting the first data set includes:
prompting, by the first device, the user to perform at least two different actions; and
operating a sensor to collect sensor data while the user performs the at least two different actions.

14. The method of claim 13 wherein an order in which the at least two different actions are performed is selected by the user.

15. The method of claim 13, wherein the actions are selected by the user.

16. The method of claim 13 wherein the actions include at least two of:
traversing the route;
waving the first device in a user selected pattern;
presenting a biometric identifier to a biometric sensor of the first device;
playing a song on the first device;
taking a photo using a camera of the first device;
sending a text to someone using the first device; or
interacting with an app installed on the first device.

17. The method of claim 9, wherein the number N is at least 100.

18. The method of claim 9 further comprising, during a verification process subsequent to the enrollment process:
collecting, at a second device, a second action data set representing a second performance of the action sequence by a person purporting to be the user;
generating, at the second device, a second set of N key pairs based on the second action data set using the key generation algorithm, wherein each key pair in the second set includes a public key and a private key; and
performing, at the second device, a zero knowledge probabilistic proof with the server using the private key of each of the N key pairs in the second set, wherein successful performance of the zero knowledge probabilistic proof establishes to the server that the second device has sufficient knowledge of the private keys corresponding to N public keys stored at the server.

19. The method of claim 18 wherein sufficient knowledge requires knowledge of at least a threshold fraction of the private keys.

20. The method of claim 18 wherein the N key pairs are divided into a plurality of subsets including a first subset of key pairs that are highly reproducible and a second subset of key pairs that are less reproducible and wherein sufficient knowledge requires knowledge of at least a first threshold fraction of the keys in the first subset and knowledge of at least a second threshold fraction of the keys in the second subset, wherein the first threshold fraction is higher than the second threshold fraction.

21. The method of claim 18 wherein each key pair is assigned a weight corresponding to its degree of reproducibility and wherein sufficient knowledge requires attaining at least a minimum score, the minimum score being computed based at least in part on the weights of the key pairs determined to be possessed by the second device.

22. The method of claim 18 wherein the verification process is an account recovery process, the method further comprising:
  recovering access to the user account information record in response to successful performance of the zero knowledge probabilistic proof.

23. The method of claim 22 wherein recovering access to the user account information record includes establishing a new account credential for the account.

24. The method of claim 23 wherein the new account credential includes a new password.

25. The method of claim 18 wherein the verification process is a user identity verification process that results in the server generating a user identity certification in response to successful performance of the zero knowledge probabilistic proof.

26. The method of claim 25 wherein the user identity certification is delivered to a third party server system.

27. The method of claim 18 wherein the second device is a different device from the first device.

28. An electronic device comprising:
  a user interface;
  at least one sensor;
  a communication interface to communicate with a server system; and
  a processor coupled to the user interface and the communication interface, the processor configured to:
    collect, during an account recovery service enrollment process of a user account maintained at a server, a first action data set using the sensor and the user interface, the first action data set representing a first performance of an action sequence by a user, wherein the first action data set is approximately reproducible by the user reperforming the action sequence,
    wherein the action sequence comprises traversing a route comprising a starting point geographic location and an ending point geographic location designated by the user during the account recovery service enrollment process at a predetermined speed;
    generate a first set of N key pairs based on the first action data set using a key generation algorithm, wherein a number N is greater than 1 and wherein each key pair in the first set includes a public key and a private key; and
    send to the server system, the public key of each of the N key pairs to be stored by the server in a user account information record for a user account maintained at the server system.

29. An electronic device comprising:
  a user interface;
  a communication interface to communicate with a server system; and
  a processor coupled to a biometric sensor and the communication interface, the processor configured to:
    collect, during an account recovery service enrollment process of a user account maintained at a server, an action data set representing a performance of an action sequence by a person purporting to be an authorized user of a user account at the server system,
    wherein the action sequence comprises traversing a route comprising a starting point and an ending point designated by the user during the account recovery service enrollment process at a predetermined speed;
    generate a set of N key pairs based on the action data set using a key generation algorithm, wherein each key pair in the action data set includes a public key and a private key; and
    perform a zero knowledge probabilistic proof with the server system using the private key of each of the N key pairs in the set, wherein successful performance of the zero knowledge probabilistic proof establishes to the server system that the electronic device is in possession of private keys corresponding to at least a minimum number K of a recovery key set of N public keys stored at the server system, wherein K is less than N.

30. The electronic device of claim 29 wherein the processor is further configured to:
  recover access to a user account information record in response to successful performance of the zero knowledge probabilistic proof.

31. A server system comprising:
  a data store to store user account information records for a plurality of user accounts, wherein the user account information records comprises account recovery service enrollment information;
  a network interface to communicate with a plurality of computer devices including a user device and a verification device, wherein the user device is configured to collect, during an account recovery service enrollment process of a user account maintained at the server system, a first action data set representing a first performance of an action sequence by a user, wherein the action sequence comprises traversing a route comprising a starting point and an ending point designated by the user at a predetermined speed; and
  a processing subsystem coupled to the data store and the network interface, the processing subsystem configured to:
    obtain from the user device a set of N recovery keys for a user account, wherein a first user device generates the set of N recovery keys using biometric data of a user to whom the user account belongs;
    store the set of N recovery keys in a user account information record for the user account;
    receive a verification request, the verification request identifying the user account; and perform a zero knowledge probabilistic proof with a verification device using the stored set of N recovery keys, wherein successful performance of the zero knowledge probabilistic proof establishes to the processing subsystem that the verification device is in possession of private keys corresponding to at least a minimum number K of the keys in the set of N recovery keys, wherein K is less than N.

32. The server system of claim 31 wherein the verification request includes an account recovery request and wherein the processing subsystem is further configured to recover access to the user account information record in response to successful performance of the zero knowledge probabilistic proof.

33. The server system of claim 31 wherein the verification request includes an identity verification request and wherein the processing subsystem is further configured to generate a user identity certification in response to successful performance of the zero knowledge probabilistic proof.

34. The server system of claim 31 wherein the user device and the verification device are the same device.

\* \* \* \* \*